(12) United States Patent
Iida et al.

(10) Patent No.: US 8,250,862 B1
(45) Date of Patent: Aug. 28, 2012

(54) VEHICLE

(75) Inventors: Masaru Iida, Hyogo (JP); Fumitoshi Ishino, Hyogo (JP); Koji Irikura, Morristown, TN (US)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 118 days.

(21) Appl. No.: 12/790,544

(22) Filed: May 28, 2010

Related U.S. Application Data

(63) Continuation of application No. 11/859,518, filed on Sep. 21, 2007, now abandoned.

(51) Int. Cl.
  *F16D 31/02* (2006.01)
  *B62D 11/02* (2006.01)
  *B60K 17/14* (2006.01)
(52) U.S. Cl. .................. 60/487; 180/6.48; 180/308
(58) Field of Classification Search .............. 60/487, 60/488; 180/305, 307, 308, 6.3, 6.32, 6.38, 180/6.48
  See application file for complete search history.

(56) References Cited

U.S. PATENT DOCUMENTS

| 5,495,712 | A | 3/1996 | Yano et al. | |
|---|---|---|---|---|
| 5,927,073 | A | 7/1999 | Ishizaki et al. | |
| RE37,049 | E | 2/2001 | Ishii et al. | |
| 6,585,088 | B1 | 7/2003 | Fontaine et al. | |
| 6,951,259 | B2 * | 10/2005 | Irikura | 180/307 |
| 7,073,330 | B1 | 7/2006 | Hauser | |
| 7,234,301 | B1 | 6/2007 | Hauser | |
| 7,455,130 | B2 * | 11/2008 | Irikura | 180/308 |
| 2006/0225927 | A1 | 10/2006 | Iwaki et al. | |

* cited by examiner

*Primary Examiner* — Michael Leslie
(74) *Attorney, Agent, or Firm* — Sterne, Kessler, Goldstein & Fox P.L.L.C.

(57) ABSTRACT

A hydrostatic transaxle comprises: a housing; an axle disposed in the housing; a hydraulic motor having a rotary axis disposed in the housing; an inward-and-outward opened hole formed in the housing and disposed on the rotary axis of the hydraulic motor; and first and second motor shafts prepared to serve as a motor shaft of the hydraulic motor for driving the axle. One of the first and second motor shafts is selected to be disposed on the rotary axis of the hydraulic motor in the housing. When the first motor shaft is selected, an outer end of the first motor shaft is disposed in the housing so as to face the hole. When the second motor shaft is selected, an outer end of the second motor shaft projects outward from the housing through the hole.

5 Claims, 24 Drawing Sheets

VEHICLE

BACKGROUND OF THE INVENTION

1. Field of the Invention

The present invention relates to a hydrostatic transaxle including a housing incorporating an axle and a hydraulic motor for driving the axle.

2. Related Art

Conventionally, as disclosed in U.S. 2006-225927 A1, there is a well-known hydrostatic transaxle including a housing in which an axial piston type hydraulic motor and an axle driven by the hydraulic motor are disposed. The housing incorporates a brake system including a brake rotor disposed on a motor shaft on the rotary axis of the hydraulic motor.

The brake system including the brake rotor disposed in the housing is a wet brake which is advantageous in performance and stability. However, the wet brake is expensive and has poor maintenancability. On the other hand, a dry brake is noticeable in its inexpensiveness to be exposed on the housing of the transaxle. However, in comparison with the wet brake, the dry brake is disadvantageous in performance and stability after all. If a hydrostatic transaxle is standardized so as to correspond to whether it has a wet brake in its housing or a dry brake disposed outside of the housing, the hydrostatic transaxle is greatly advantageous in economy. Further, with respect to the conventional hydrostatic transaxle, if rotary speed and direction of axles has to be detected for providing a steer-by-wire control system, the housing has to be formed to have a hole or the like for mounting a rotary speed sensor, so as to increase the number of manufacturing processes and costs. If the above-mentioned standardization corresponds to mounting of the rotary speed sensor, the transaxle is further advantageous in economy.

SUMMARY OF THE INVENTION

An object of the invention is to provide a hydrostatic transaxle including a housing in which an axle and a hydraulic motor for driving the axle are disposed, wherein the hydrostatic transaxle corresponds to either a wet brake to be disposed in the housing or a dry brake to be disposed outside of the housing.

To achieve the object, according to the invention, a hydrostatic transaxle comprises: a housing; an axle disposed in the housing; a hydraulic motor having a rotary axis disposed in the housing; an inward-and-outward opened hole formed in the housing and disposed on the rotary axis of the hydraulic motor; and one of prepared first and second motor shafts to serve as a motor shaft of the hydraulic motor for driving the axle. One of the first and second motor shafts is selected to be disposed on the rotary axis of the hydraulic motor in the housing. When the first motor shaft is selected, an outer end of the first motor shaft is disposed in the housing so as to face the hole. When the second motor shaft is selected, an outer end of the second motor shaft projects outward from the housing through the hole.

Therefore, due to the simple and inexpensive processing and preparation such as to form the hole in the housing on the rotary axis of the hydraulic motor and to prepare the first and second motor shafts having different lengths, the hydrostatic transaxle can be provided with either a wet brake disposed in the housing due to selection of the first motor shaft or a dry brake disposed outside of the housing due to selection of the second motor shaft, thereby progressing standardization of the hydrostatic transaxle advantageously in economy. Further, due to selection of the second motor shaft, an outer end of the second motor projecting outward from the housing can be easily used as a target of rotary speed detection.

When the first motor shaft is selected, a brake rotor is disposed on the first motor shaft in the housing, and the hole is plugged with a cap. Therefore, the hydrostatic transaxle can be easily designed to have a stable inner wet brake.

Preferably, the hole has a diameter which is larger than a diameter of the brake rotor on the first motor shaft. Therefore, only by removing the cap from the hole, the brake rotor can be easily removed conveniently to maintenance of the wet brake.

When the second motor shaft is selected, a brake rotor is disposed on the second motor shaft outside of the housing. Therefore, the hydrostatic transaxle can be easily designed to have an inexpensive outer dry brake.

Preferably, a brake casing is mounted on an outer end of the housing so as to incorporate the brake rotor on the second motor shaft. Therefore, the brake rotor disposed outside of the housing can be protected.

Further preferably, the housing is formed at the outer end thereof with a stay portion onto which the brake casing is mounted, and a rotary speed sensor replacing the brake casing can be mounted onto the stay portion. Therefore, when the second motor shaft is selected, the hydrostatic transaxle can be easily designed to have the rotary speed sensor instead of the dry brake and the brake casing. Since the housing is not required to have variation corresponding to whether the hydrostatic transaxle is provided with the rotary speed sensor or the dry outer brake, the standardization of the hydrostatic transaxle is ensured.

When the second motor shaft is selected, a rotary sensor is mounted on an outer end of the housing so as to face the outer end of the second motor shaft projecting outward from the housing through the hole. Therefore, the second motor shaft projecting outward from the housing can be used as a target of the rotary speed detection.

Preferably, a detection value of the rotary speed sensor is used for controlling a turning angle of a steerable wheel of a vehicle equipped with the hydrostatic transaxle. Therefore, the hydrostatic transaxle can be easily designed to have the rotary speed sensor for steering control of a target vehicle.

Preferably, when the rotary speed sensor is mounted on the housing, a brake rotor is disposed on the second motor shaft in the housing. Therefore, the hydrostatic transaxle can be easily designed to have the rotary speed sensor and the stable wet inner brake.

Preferably, another axle is disposed in the housing so as to be driven by the selected first or second motor shaft. Therefore, the above-mentioned feature is adaptable to the hydrostatic transaxle having a pair of left and right axles.

These, other and further objects, features and advantages of the invention will appear more fully from the following description with reference to accompanying drawings.

DETAILED DESCRIPTION OF THE INVENTION

Figure 1:
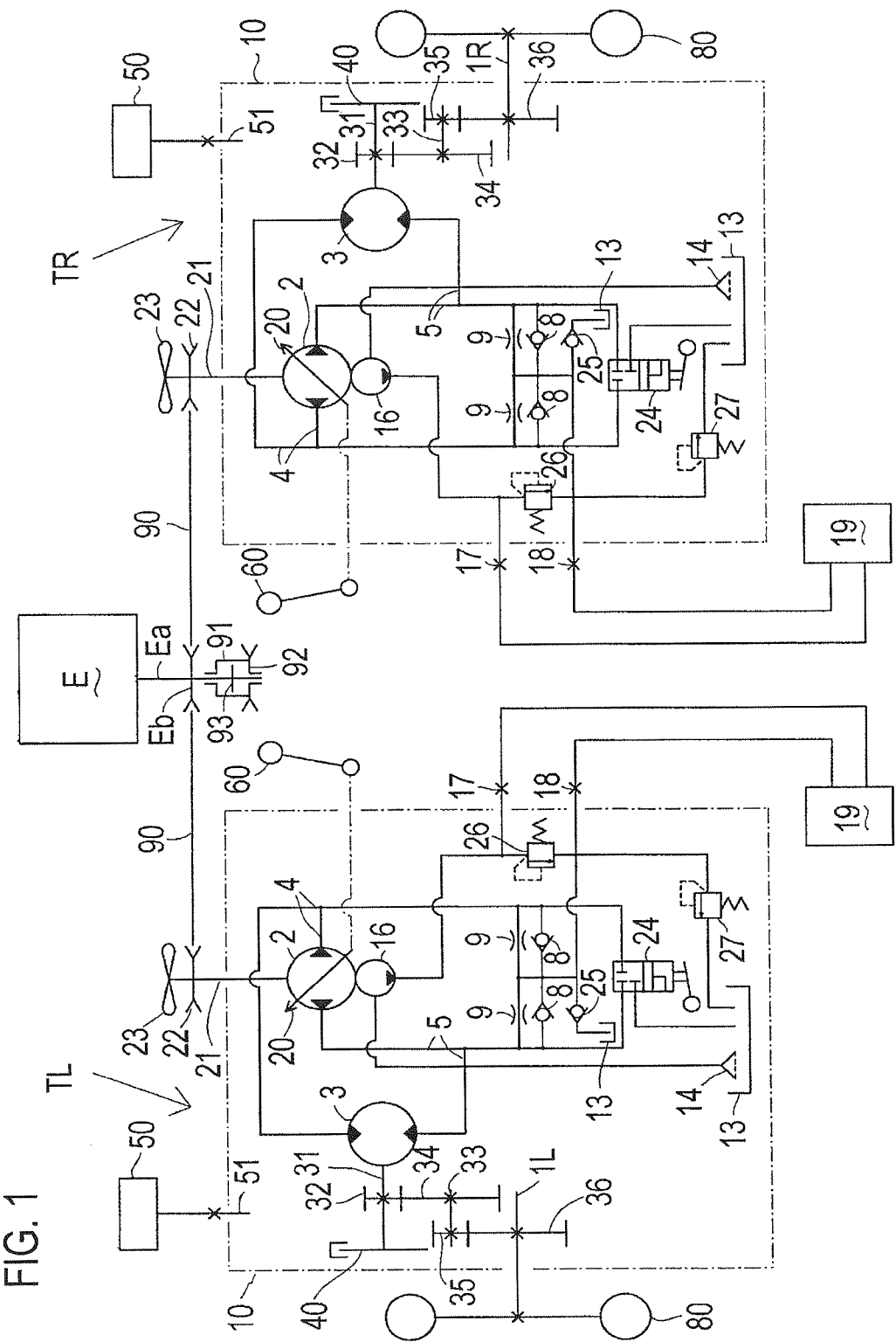
FIG. 1 is a hydraulic circuit diagram of a pair of left and right hydrostatic transaxles T (TL and TR) adapted to a vehicle.

Referring to FIG. 1, a hydraulic circuit system for a vehicle equipped with a pair of left and right hydrostatic transaxles TL and TR, each of which is generally named as "transaxle T", will be described. Transaxle T (i.e., each of transaxle TL and TR) includes a housing 10 incorporating a hydraulic pump 2 and a hydraulic motor 3. On the assumption that left and right transaxles TL and TR are installed onto a vehicle body frame, left transaxle TL has a left axle 1L projecting leftward from housing 10, and right transaxle TR has a right axle 1R projecting rightward from housing 10. Each of left and right axles 1L and 1R is generally named as axle 1. Drive wheels 80 are fixed on outer ends of respective axles 1L and 1R outside of respective housings 10 of transaxles TL and TR.

In housing 10 of transaxle T, hydraulic pump 2 and motor 3 are fluidly connected to each other through a pair of fluid passages 4 and 5, so as to constitute a hydrostatic transmission (hereinafter, referred to as "HST"). Hydraulic pump 2 is provided with a movable swash plate 20 serving as a pump displacement control device. A pump control arm 60 is disposed on a laterally proximal outside of housing 10 (laterally opposite to the projecting side of axle 1). However, transaxle T can be designed to have pump control arm 60 on a laterally distal outside of housing 10 (at the same lateral side with the projecting side of axle 1), as discussed later. Pump control arm 60 are rotatable so as to control the tilt angle and direction of movable swash plate 20 for determining the delivery amount and direction of hydraulic pump 2, i.e., for determining the rotary speed and direction of hydraulic motor 3 and axle 1. Due to in which direction movable swash plate 20 is tilted, one of fluid passages 4 and 5 is pressurized higher than the other.

Hydraulic pumps 2 receive power from an engine E. In this regard, engine E has an engine output shaft Ea and an engine output pulley Eb fixed on engine output shaft Ea. On the other hand, each of hydraulic pumps 2 has a pump shaft 21 which projects outward from housing 10 so as to serve as an input shaft of transaxle T. An input pulley 22 and a cooling fan 23 are fixed on pump shaft 21 outside of housing 10. A belt 90 is looped over engine output pulley Eb and input pulleys 22 of left and right transaxles TL and TR, so as to transmit power from engine E to hydraulic pumps 2 of left and right transaxles TL and TR.

Engine output shaft Ea is extended and inserted into a PTO clutch casing 91 fixed to a PTO pulley 92. In PTO clutch casing 91, a PTO clutch 93 is interposed between engine output shaft Ea and PTO pulley 92. A belt (not shown) is looped over PTO pulley 92 so as to drive a working device, such as a mower unit M shown in FIG. 16.

Housing 10 of transaxle T incorporates a motor shaft 31 of hydraulic motor 3 and a counter shaft 33, which are disposed in parallel to axle 1. Housing 10 incorporates a deceleration gear train interposed between motor shaft 31 and axle 1. In this regard, a motor output gear 32 is fixed on motor shaft 31, and a bull gear 36 is fixed on axle 1. A diametrically large gear 34 is provided on counter shaft 33, and meshes with motor output gear 32. A diametrically small final pinion 35 is provided on counter shaft 33, and meshes with bull gear 36, thereby constituting the deceleration gear train.

Motor shaft 31 is extended so as to be fixedly provided thereon with a brake rotor 40 constituting a wet inner brake disposed in housing 10 of transaxle T. An alternative motor shaft 73 (see FIG. 13) may be extended outward from housing 10 so as to be provided thereon with a dry outer brake, as discussed later.

A charge pump 16 is disposed in housing 10 so as to suck fluid through a fluid filter 14 from a fluid sump 13 in housing 10. An external reservoir tank 50 is exposed on housing 10 so as to supply or absorb fluid to and from fluid sump 13 through a siphon 51 in correspondence to volumetric expansion and contraction of fluid of fluid sump 13. Housing 10 is provided with a pair of outwardly opened ports 17 and 18, which are connected through respective external pipes to an external hydraulic implement 19, such as a hydraulic power steering cylinder serving as a later-discussed electromagnetic actuator 97 or a hydraulic lift device for lifting a working device.

Port 17 is a fluid supply port for supplying fluid to hydraulic device 19. Charge pump 16 delivers fluid to port 17 in housing 10. In housing 10, an implement pressure regulating valve 26 regulates pressure of fluid supplied from charge pump 16 to port 17.

Port 18 is a fluid recovery port to which fluid is drained from hydraulic implement 19. In housing 10, fluid from port 18 is supplied to a pair of charge check valves 8 connected to respective fluid passages 4 and 5. When one of fluid passages 4 and 5 is hydraulically depressed, charge check valve 8 connected to depressed fluid passage 4 or 5 is opened to supply fluid to depressed fluid passage 4 or 5. In housing 10, charge pressure regulating valve 27 regulates pressure of fluid from port 18 to charge check valves 8.

Each of charge check valves 8 is provided with an orifice 9, which bypasses charge check valve 8 so as to serve as a neutral valve for expanding the neutral zone of the HST. Fluid escapes from higher-pressurized fluid passage 4 or 5 through orifice 9, so that, as soon as pump control arm 60 arrives in a certain range (play zone) including its proper neutral position (straight traveling position), the pressure in corresponding fluid passage 4 or 5 becomes zero so as to surely stop hydraulic motor 3 and axle 1.

In housing 10, the HST is provided with a bypass valve 24. Bypass valve 24 is operable outside of housing 10. Bypass valve 24 is normally closed as shown in FIG. 1. When the vehicle has to be towed or for another reason, bypass valve 24 is forcibly opened to drain fluid from fluid passages 4 and 5 to fluid sump 13, so as to allow hydraulic motor 3 and axle 1 to rotate freely from the hydraulic pressure of the HST.

Further, in housing 10, the HST is provided with a freewheel prevention valve 25 connected to a fluid passage between port 18 and charge check valves 8. If engine E is stopped and the vehicle stays on a slope, fluid may leak out from the closed fluid circuit of the HST, however, charge pump 16 cannot supply fluid to the closed fluid circuit because engine E is stationary. Consequently, the vehicle has possibility of freewheeling to descend the slope. In this case, due to the hydraulic depression of the HST closed fluid circuit caused by the fluid leak, freewheel prevention valve 25 is naturally opened to supply fluid from fluid sump 13 to the HST closed fluid circuit, thereby surely applying the dynamic brake of hydraulic pressure in the HST closed fluid circuit onto hydraulic motor 3 and axle 1.

Figure 2:
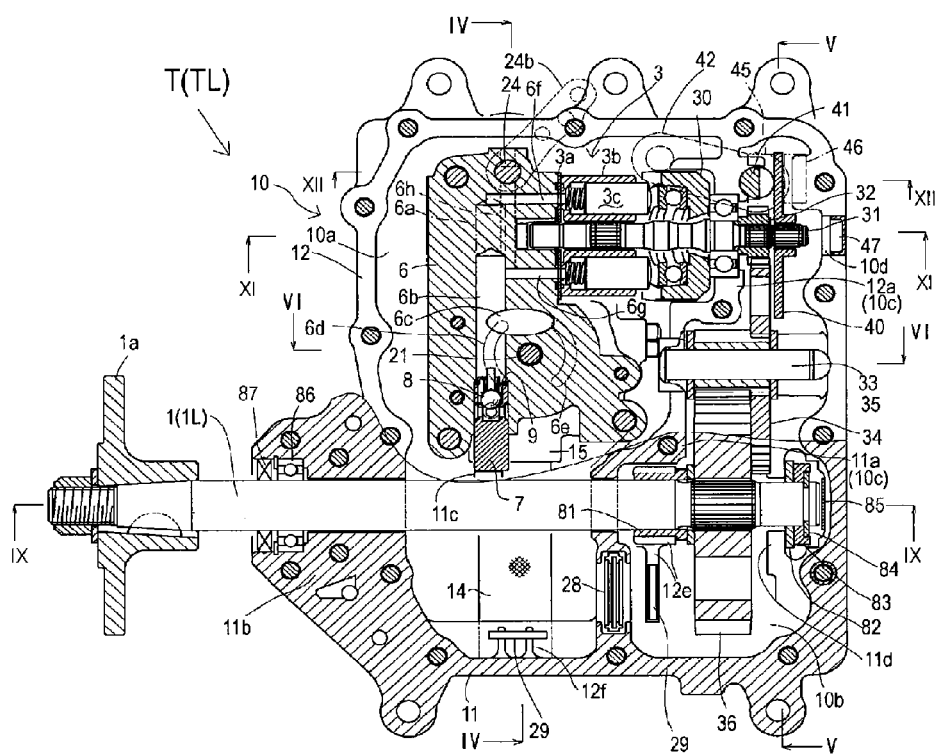
FIG. 2 is a sectional plan view of hydrostatic transaxle (left transaxle TL) having a left axle 1L.
Figure 3:
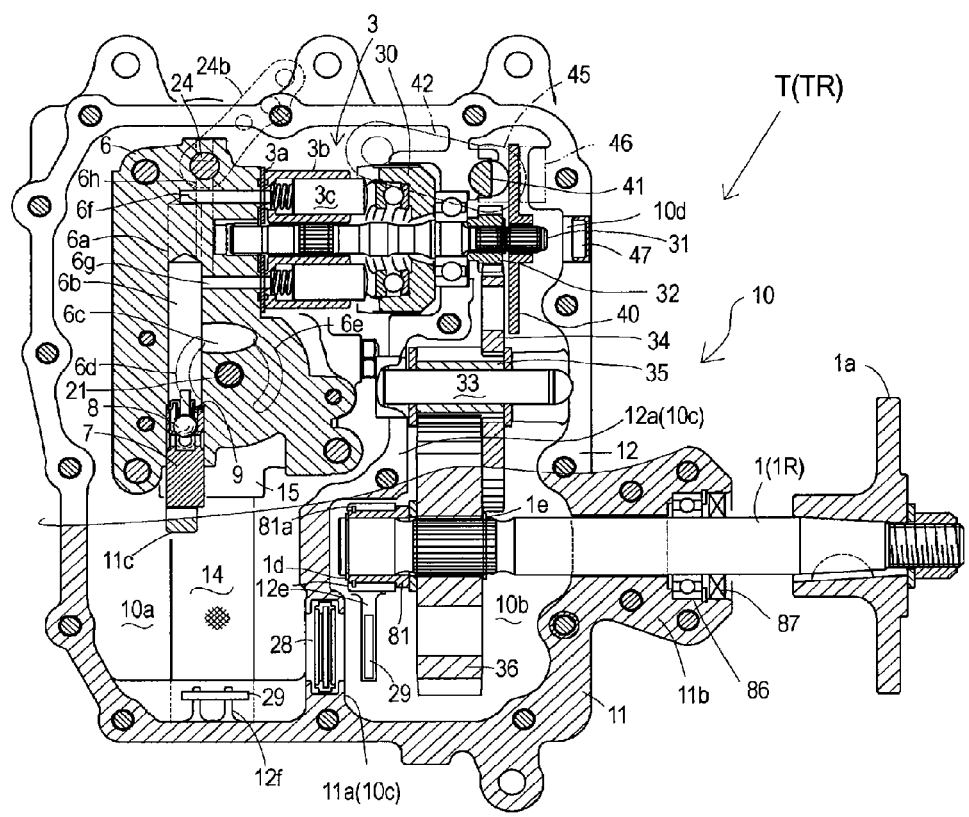
FIG. 3 is a sectional plan view of hydrostatic transaxle (right transaxle TR) having a right axle 1R.

Referring to FIGS. 2 and 3, a general layout of elements in housing 10 of each of left and right transaxles TL and TR will be described. Hereinafter, on the assumption that a vehicle is equipped with left and right transaxles TL and TR on a vehicle body frame as shown in FIG. 1, terms "laterally proximal" and "laterally distal" are referred to based on a lateral center of the vehicle between left and right transaxles TL and TR. In other words, a "laterally proximal" side of transaxle T is opposite to the projecting side of axle 1, and a "laterally distal" side of transaxle T is the same with the projecting side of axle 1. Further, simple words "left" and "right" are referred to so as to define left and right sides of individual transaxle T. Consequently, with respect to left transaxle TL, the left side is defined as the laterally distal side, and the right side is defined as the laterally proximal side. With respect to right transaxle TR, the left side is defined as the laterally proximal side, and the right side is defined as the laterally distal side.

Housing 10 includes an upper housing half 11 and a lower housing half 12 vertically joined to each other through a horizontal joint surface. The sectional plan view of housing 10 in each of FIGS. 2 and 3 includes a plan view of a front portion of lower housing half 12, from which upper housing half 11 has been removed, and a sectional plan view of a rear portion of upper housing half 11.

An inner space of housing 10 is laterally divided into a left HST chamber 10*a* and a right gear chamber 10*b*. In this regard, upper housing half 11 is formed with an downward vertical wall 11*a*, and lower housing half 12 is formed with an upward vertical wall 12*a* corresponding to downward vertical wall 11*a*, so that vertical walls 11*a* and 12*a* are joined to each other to serve as a partition wall 10*c* between chambers 10*a* and 10*b* when upper and lower housing halves 11 and 12 are joined to each other. The HST, including hydraulic pump 2 and motor 3 and a center section 6, is disposed in HST chamber 10*a*. The deceleration gear train interposed between motor shaft 31 and axle 1, and the wet inner brake including brake rotor 40, are disposed in gear chamber 10*b*.

Axle 1 is supported by the rear portion of upper housing half 11 illustrated in FIGS. 2 and 3. Transaxles TL and TR have respective structures of supporting respective axles 1L and 1R, which are distinctive from each other.

In this regard, right transaxle TR shown in FIG. 3 has a rightward projecting axle support portion 11*b* formed by a right (laterally distal) outer wall of upper housing half 11 so as to journal an axially intermediate portion of right axle 1R through a bearing 86 and a fluid seal 87. A right end of right axle 1R is a laterally distal outer end disposed outside of housing 10, and a left end of right axle 1R is a laterally proximal inner end disposed in gear chamber 10*b* close to partition wall 10*c*. In other words, right axle 1R is not extended at the inner end thereof to enter HST chamber 10*a*.

In gear chamber 10*b* of right transaxle TR, a bull gear 36 is fixed on right axle 1R, and a collar 81 serving as a radial bearing is peripherally provided on right axle 1R on an adjacent left side of bull gear 36 and is fitted into a sectionally semicircular recess in a support wall 12*e* formed on lower housing half 12. A retaining ring 81*a* is peripherally engaged on collar 81 and is engaged into support wall 12*e*. A retaining ring 1*d* is peripherally engaged on right axle 1R adjacent to the left (laterally proximal) end of right axle 1R so as to abut against an end surface of collar 81 axially opposite to bull gear 36. A retaining ring 1*e* is peripherally engaged on an axially intermediate portion of right axle 1R so as to abut against a right side surface of bull gear 36 axially opposite to collar 81. In this way, retaining rings 81*a*, 1*d* and 1*e* constitute a restriction mechanism for restricting axial slide of axle 1 (relative to bull gear 36).

On the other hand, left transaxle shown in FIG. 2 has a leftward projecting axle support portion 11*b* formed by a left (laterally distal) outer wall of upper housing half 11 so as to journal an axially intermediate portion of left axle 1L through a bearing 86 and a fluid seal 87. A left end of left axle 1L is a laterally distal outer end disposed outside of housing 10, and a right end of left axle 1L is a laterally proximal inner end disposed in gear chamber 10*b* close to a right (laterally proximal) outer wall of housing 10. Center section 6 is standardized so as to be used for each of left and right transaxles TL and TR, and gear chamber 10*b* of each of left and right transaxles TL and TR is formed along a right side outer wall of housing 10 (a lateral proximal outer wall of housing 10 of left transaxle TL, or a lateral distal outer wall of right transaxle TR). Therefore, left axle 1L is extended through HST chamber 10*a* so as to be axially longer than right axle 1R. Another restriction mechanism for restricting axial slide of left axle 1L will be described later.

Since left and right transaxles TL and TR are standardized in structure excluding the above-mentioned structures for supporting respective axles 1L and 1R, only left transaxle TL will be described with reference to FIGS. 2 and 4 to 12 in place of description of transaxle T as each of transaxles TL and TR.

Figure 4:
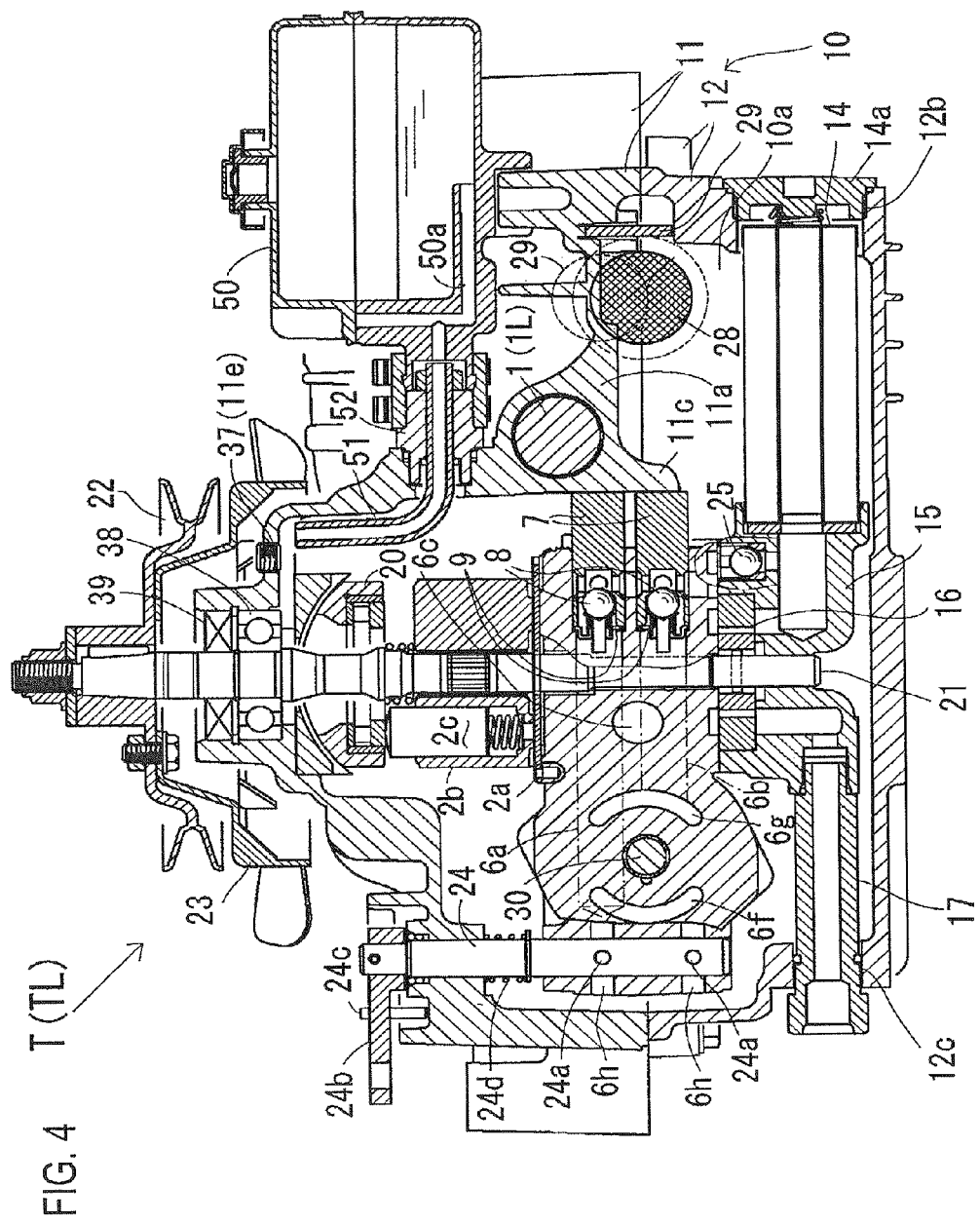
FIG. 4 is a cross sectional view taken along IV-IV line of FIG. 2.

The HST will be described. As shown in FIGS. 2 and 4, center section 6 is, preferably removably, fixed in HST chamber 10a of housing 10 in front of axle 1. Center section 6 has a horizontal upper surface at a rear portion thereof so as to serve as a pump mounting surface onto which hydraulic pump 2 is mounted. Center section 6 has a vertical side surface at a front portion thereof so as to serve as a motor mounting surface onto which hydraulic motor 3 is mounted. Consequently, in the fore-and-aft direction, hydraulic pump 2 is disposed between axle 1 and hydraulic motor 3.

Figure 6:
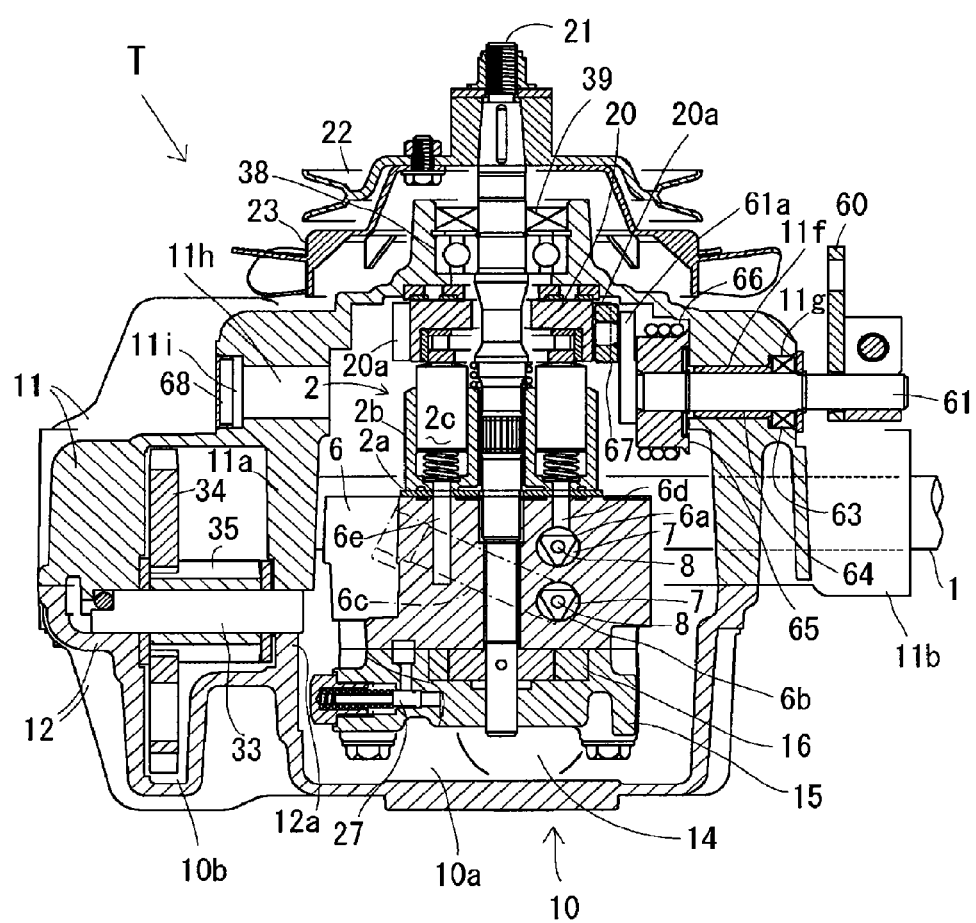
FIG. 6 is a cross sectional view taken along VI-VI line of FIG. 2 when a pump control arm is disposed on the same lateral side with the projection side of the axle.

As shown in FIGS. 2, 4 and 6, center section 6 is formed with a pair of kidney ports 6d and 6e opened at the pump mounting surface to hydraulic pump 2, and is formed with a pair of kidney ports 6f and 6g opened at the motor mounting surface to hydraulic motor 3. Center section 6 is formed with upper and lower fluid holes 6a and 6b extended fore-and-aft horizontally in parallel to each other, and is formed with a fluid hole 6c extended upwardly slantwise from lower fluid hole 6b. Upper fluid hole 6a is opened at a rear portion thereof to kidney port 6d, and is opened at a front portion thereof to kidney port 6f, so as to constitute fluid passage 4. Lower fluid hole 6b is opened at a rear portion thereof to kidney port 6e through fluid hole 6c, and is opened at a front portion thereof to kidney port 6g, so as to constitute fluid passage 5.

Figure 9:
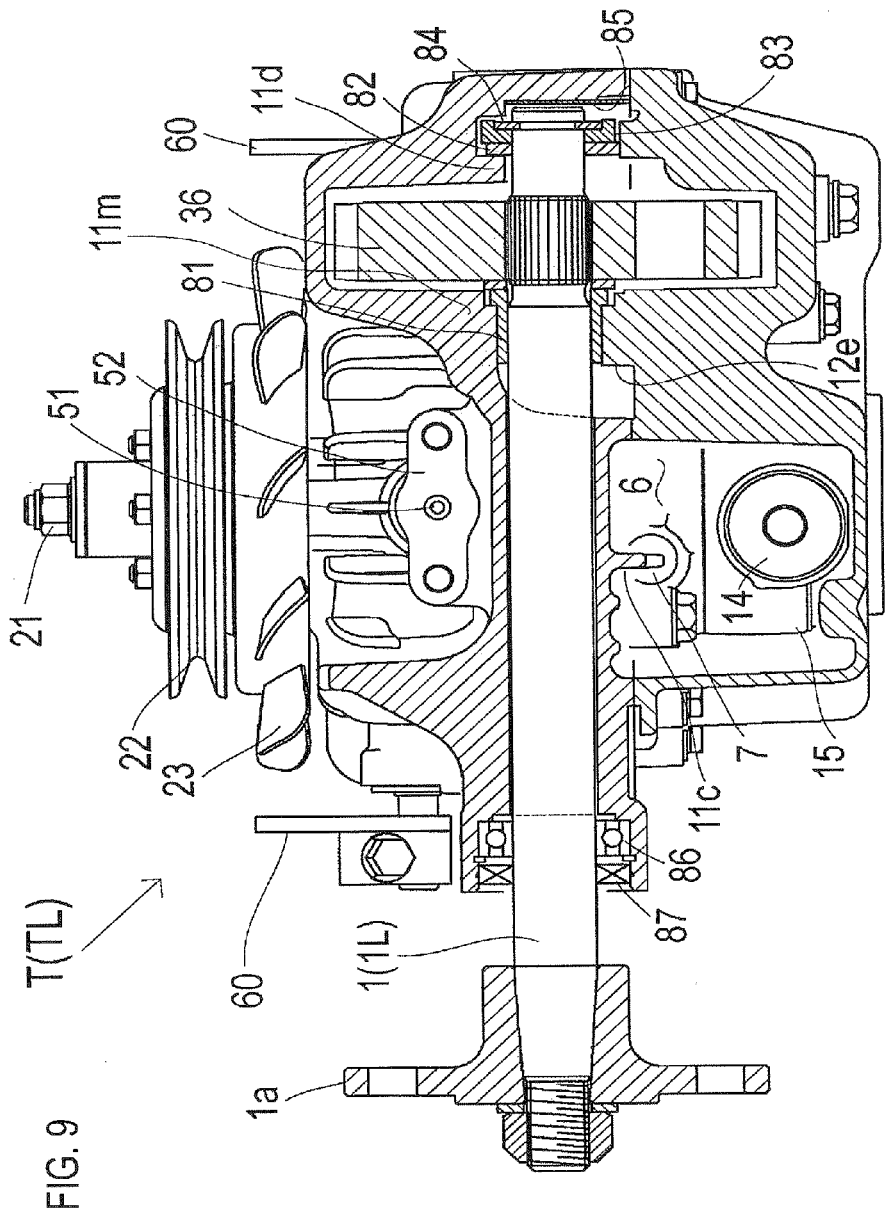
FIG. 9 is a cross sectional view taken along IX-IX line of FIG. 2.

Fluid holes 6a and 6b are extended rearward, and are opened at rear ends thereof outward from center section 6. As shown in FIGS. 2, 4 and 6, a pair of charge valve casings 7, incorporating respective charge check valve 8 and forming respective orifices 9 therein, are fitted into the rear openings of respective fluid holes 6a and 6b. Charge valve casings 7 project rearward from the rear end of center section 6. As shown in FIGS. 2, 4 and 9, upper housing half 11 is formed with a valve retainer wall 11c extended downward from a portion of downward vertical wall 11a so as to abut against the rear outer ends of charge valve casings 7, thereby preventing charge valve casings 7 with charge check valves 8 and orifices 9 from escaping from center section 6.

As shown in FIGS. 2 and 4, a pair of upper and lower bypass fluid holes 6h are formed in center section 6, so as to be extended forward from respective fluid holes 6a and 6b, and opened at a front end of center section 6. A vertically axial rotary valve serving as bypass valve 24 described with reference to FIG. 1 is rotatably fitted into a front portion of center section 6 so as to cross both upper and lower bypass fluid holes 6h. In center section 6, upper and lower diametric holes 24a are formed in bypass valve 24 so as to correspond to respective bypass fluid holes 6h.

FIG. 4 illustrates bypass valve 24 normally set at a closed-valve position where holes 24a are not opened to respective bypass fluid holes 6h. When bypass valve 24 is rotated at a quarter round, holes 24a are opened to respective bypass fluid holes 6h, so as to drain fluid from fluid holes 6a and 6b (i.e., fluid passages 4 and 5) to a fluid sump in HST chamber 10a (i.e., fluid sump 13 shown in FIG. 1) outside of center section 6 through the front openings of bypass fluid holes 6h.

As shown in FIG. 4, a top end of bypass valve 24 projects upward from upper housing half 11 so as to be fixedly provided thereon with a bypass arm 24b. Bypass valve 24 is switchable between the closed-valve position and an opened-valve position according to operation of bypass arm 24b. To set bypass valve 24 at either of the two valve positions, a stopper 24c is fixed upright on bypass arm 24b, and two steps are formed on a top surface of upper housing half 11 and are adapted to abut against stopper 24c. Further, to constitute a detent mechanism for holding bypass valve 24 at the set opened-valve or closed-valve position, in housing 10, a spring 24d is wound around bypass valve 24 so as to bias bypass valve 24 to the set valve position.

As shown in FIGS. 4 and 6, hydraulic pump 2 includes a valve plate 2a, a cylinder block 2b, pistons 2c, pump shaft 21 and movable swash plate 20. Valve plate 2a is fixed on the pump mounting surface of center section 6. Cylinder block 2b is slidably rotatably fitted onto valve plate 2a, and pistons 2c are vertically reciprocally fitted into cylinder block 2b. Vertical pump shaft 21 is disposed on the vertical center axis of cylinder block 2b. Movable swash plate 20 is slidably rotatably fitted to a ceiling of upper housing half 11. Heads of pistons 2c are pressed against a thrust bearing of movable swash plate 20.

Pump shaft 21 is relatively unrotatably fitted at a vertically axial intermediate portion thereof to cylinder block 2b. A lower portion of pump shaft 21 is rotatably supported by center section 6, and is extended downward from center section 6 so as to be provided thereon with charge pump 16 as later discussed. An upper portion of pump shaft 21 is relatively rotatably passed through movable swash plate 21, is journalled by a top portion of upper housing half 11 through a bearing 38 and a fluid seal 39, and is extended upward from upper housing half 11.

Figure 5:
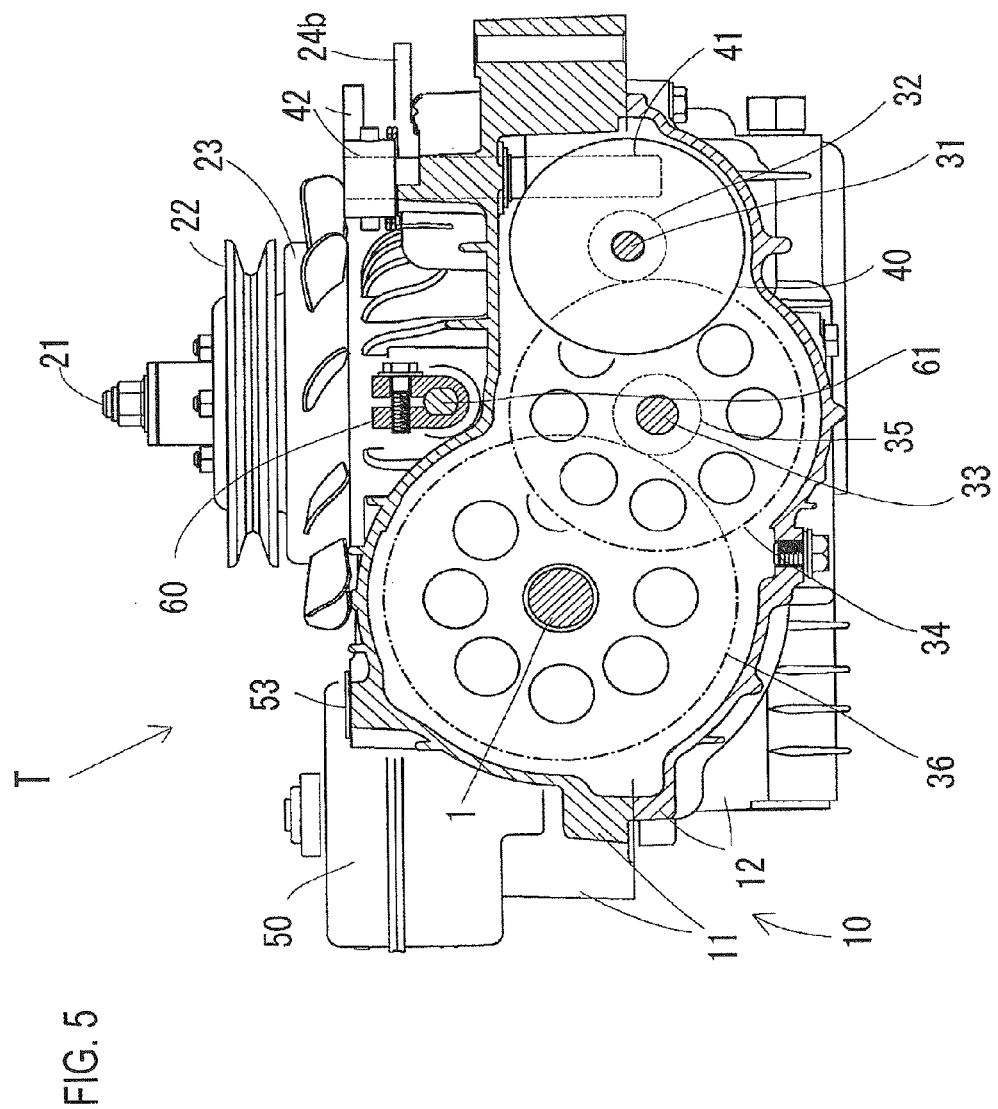
FIG. 5 is a cross sectional view taken along V-V line of FIG. 2.

As shown in FIGS. 4 to 6, the top of pump shaft 21 projecting upward from the top of upper housing half 11 is fixedly provided thereon with input pulley 22 and cooling fan 23 under input pulley 22. Input pulley 22 and cooling fan 23 are formed in downwardly opened cup-shapes, so that an upper center portion of cooling fan 23 is disposed in cooling fan 22, and the top portion of upper housing half 11 supporting bearing 38 and fluid seal 39 is disposed in cooling fan 23. Therefore, input pulley 22 and cooling fan 23 are lowered, so that transaxle T is vertically compacted, and cooling fan 23 approaches housing 10 so as to increase its effect of cooling housing 10 and reservoir tank 50 mounted on housing 10.

Figure 11:
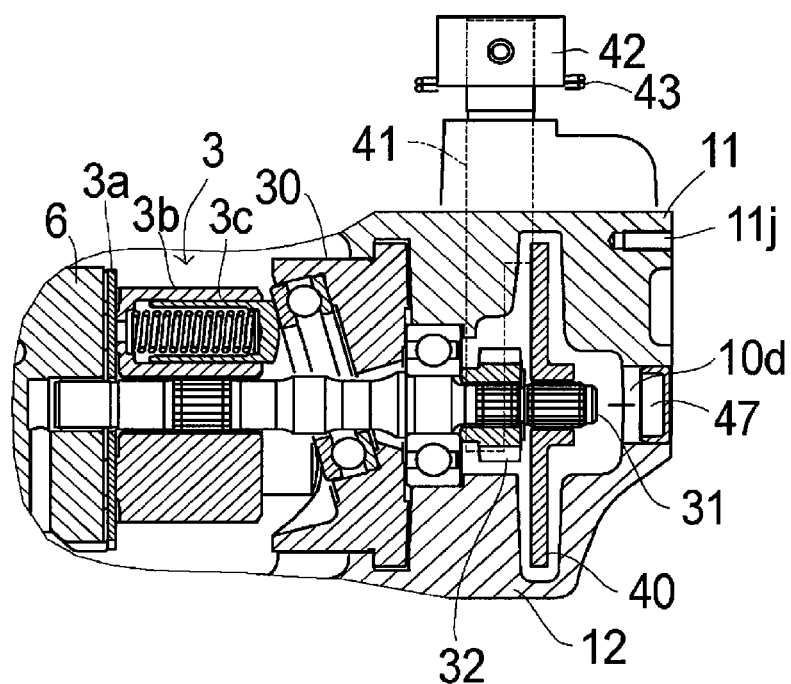
FIG. 11 is a cross sectional view taken along XI-XI line of FIG. 2 showing a portion provided with a wet inner brake.

As shown in FIGS. 2 and 11, hydraulic motor 3 includes a valve plate 3a, a cylinder block 3b, pistons 3c, motor shaft 31 and a fixed swash plate 30. Valve plate 3a is fixed on the motor mounting surface of center section 6. Cylinder block 3b is slidably rotatably fitted onto valve plate 3a, and pistons 3c are laterally horizontally reciprocally fitted into cylinder block 3b. Laterally horizontal motor shaft 31 is disposed on the laterally horizontal center axis of cylinder block 3b. Fixed swash plate 30 is fixedly sandwiched between upper and lower housing halves 11 and 12. Heads of pistons 3c are pressed against a thrust bearing of fixed swash plate 30.

The center axis of motor shaft 31 is disposed on the horizontal joint surface between upper and lower housing halves 11 and 12. Motor shaft 31 is relatively unrotatably fitted at an axial intermediate portion thereof to cylinder block 3b. A portion of motor shaft 31 rightward from cylinder block 3b (toward gear chamber 10b) is freely rotatably passed through fixed swash plate 30. Motor shaft 31 has a left end journalled by center section 6 in HST 10a, and has a right end, which projects rightward from fixed swash plate 30 into gear chamber 10b so as to face a hole 10d. Hole 10d is formed between right outer walls of upper and lower housing halves 11 and 12 so as to be disposed coaxially to motor shaft 31. Hole 10d is plugged with a cap 47.

Figure 10:
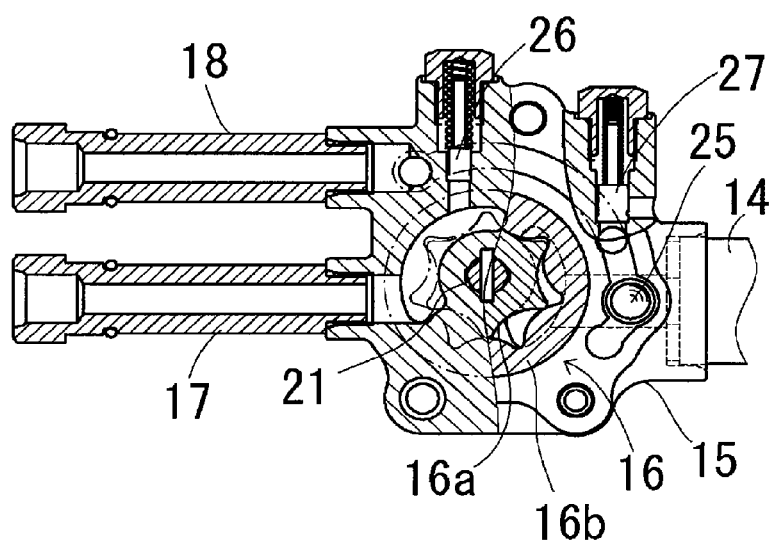
FIG. 10 is a sectional plan view of a charge pump casing of transaxle T.

Hydraulic pump 2 and motor 3 having the above structures are fluidly connected to each other through the pair of fluid passages 4 and 5 formed in center section 6 so as to constitute the HST closed fluid circuit. To supply fluid to the HST closed fluid circuit through charge check valve 8, a charge pump casing 15, incorporating charge pump 16 as shown in FIG. 10, is fixed to a bottom portion of center section 6. As shown in FIG. 10, charge pump 16 is a trochoidal pump including an inner gear 16a and an outer gear 16b. In charge pump casing 15, inner gear 16a is fixed on the above-mentioned lower portion of pump shaft 21 extended downward from center section 6.

As shown in FIG. 10 and others, horizontal cylindrical fluid filter 14 is extended rearward from charge pump casing 15. As shown in FIG. 4, a rear end of fluid filter 14 is fitted into a hole 12b inner-and-outer penetrating a rear end wall of lower housing half 12. Hole 12b is plugged with a cap 14a. For maintenance of fluid filter 14, cap 14a can be removed from hole 12b so that fluid filter 14 can be removed or inserted from and into housing 10 through hole 12b.

As shown in FIG. 10 and others, the pair of horizontal cylindrical ports 17 and 18 are extended forward from charge pump casing 15. Port 17 projects outward (forward) from housing 10 through a hole 12c inner-and-outer penetrating a front end wall of lower housing half 12 as shown in FIG. 4, and port 18 projects outward (forward) from housing 10 through a hole (not shown), which is similar to hole 12c, so that the forward projecting front ends of ports 17 and 18 are connected to hydraulic implement 19 (shown in FIG. 1) through respective pipes.

As shown in FIGS. 4, 6 and 10, freewheel prevention valve 25, implement pressure regulating valve 26 and charge pressure regulating valve 27, as mentioned above with reference to FIG. 1, are fitted into charge pump casing 15.

HST chamber 10a is filled with fluid so as to serve as fluid sump 13 shown in FIG. 1, i.e., the fluid source of the HST. As shown in FIG. 4, reservoir tank 50 is mounted on an upper portion of upper housing half 11 so as to surround the upward projecting portion of upper housing half 11 containing hydraulic pump 2. L-like bent siphon 51 is disposed in housing 10. Siphon 51 is opened at a lower end thereof to a fluid duct 50a formed in reservoir tank 50 through a joint member 52 interposed between reservoir tank 50 and upper housing half 11 as shown in FIGS. 4 and 9.

To circulate fluid through siphon 51 between fluid sump 13 in HST chamber 10a and reservoir tank 50, a level of fluid sump 13 in HST chamber 10a is required to be higher than an upper open end of siphon 51. To monitor the level of fluid sump 13 in HST chamber 10a, as shown in FIG. 4, an eyehole 11e vertically penetrates an upper wall of upper housing half 11. Eyehole 11e is normally plugged with a plug 37. Incidentally, a top end of siphon 51 is disposed adjacently under eyehole 11e, so that siphon 51 can be easily judged whether it properly functions or not. To supply fluid into housing 10, a fluid supply hole is opened at an upper surface of upper housing half 11, and is plugged with a cap 53 shown in FIG. 5. When fluid is poured into housing 10 through the fluid supply hole, eyehole 11e is plugged with cap 53 immediately after the poured fluid starts overflowing from eyehole 11e.

Gear chamber 10b is also filled with fluid serving as lube for gears in gear chamber 10b. Fluid can flow between HST chamber 10a and gear chamber 10b through a hole penetrating partition wall 10c. A metal net serving as a fluid filter 28 is fitted in the hole as shown in FIGS. 2 and 4, so as to trap impurities, especially, metal powder generated from gears in gear chamber 10b, thereby preventing the impurities from entering HST chamber 10a, i.e., preventing the impurities from damaging rotatable and slidable components of the HST.

In gear chamber 12b, a support wall 12e is formed of lower housing half 12 and supports a discoid magnet 29 facing fluid filter 28. Further, in HST chamber 10a, support portion 12f is formed of lower housing half 12 adjacent to fluid filter 28 and supports another discoid magnet 29. Magnets 29 adsorb the metal powder so as to further prevent the metal powder from causing troubles of the HST.

Figure 7:
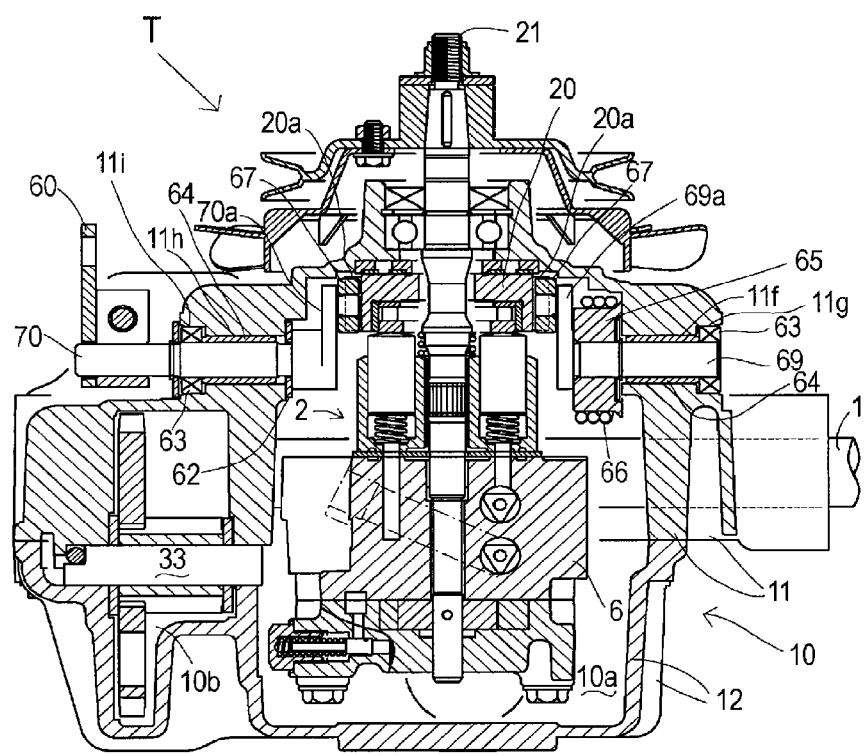
FIG. 7 is a cross sectional view taken along VI-VI line of FIG. 2 when the pump control arm is disposed on the opposite lateral side to the projection side of the axle.

Movable swash plate 20 of hydraulic pump 2 is operatively connected to pump control arm 60 disposed outside of housing 10. In this regard, transaxle T is configured so as to have pump control arm 60 on either the left or right side thereof. As shown in FIGS. 6 and 7, upper housing half 11 has left and right side walls opposite to each other with respect to hydraulic pump 2 in HST chamber 10a. Incidentally, in FIGS. 6 and 7 defined as sectional front views of transaxle T (left transaxle TL), the left side wall appears to be disposed rightward, and the right side wall appears to be disposed leftward. The left side wall is disposed laterally opposite to gear chamber 10b, and with respect to left transaxle TL, it is defined as the laterally distal side wall on the same side with the projecting side of axle 1. The left side wall is bored with a lateral horizontal left shaft hole 11f. The right side wall is disposed laterally toward gear chamber 10b, and with respect to left transaxle TL, it is defined as the laterally proximal side wall opposite to the projecting side of axle 1. The right side wall is bored with a lateral horizontal right shaft hole 11h coaxially to left shaft hole 11f. Shaft holes 11f and 11h are formed at outer ends thereof with respective diametrically large outer openings 11g and 11i. Each of shaft holes 11f and 11h can be used for supporting a pivot shaft of pump control arm 60, and a seal can be fitted into corresponding outer opening 11g or 11i.

Firstly, referring to FIG. 6, description will be given of an arrangement of pump control arm 60 disposed on the left side of housing 10 (on the laterally distal side of left transaxle TL). Pump control arm 60 is fixed on an outer end of laterally horizontal pump control shaft 61 rotatably passed through bush 64 in left shaft hole 11f, and a fluid seal 63 is fitted into outer opening 11g around pump control shaft 61.

A spring-wound member 65 is fixed on a portion of pump control shaft 61 projecting from shaft hole 11f into HST chamber 10a, and a neutral-returning spring 66 is wound on spring-wound member 65. In HST chamber 10a, pump control shaft 61 is formed integrally with an inner arm 61a extended outward from spring-wound member 65. Movable swash plate 20 is formed with a pair of opposite recesses 20a at left and right ends thereof. Inner arm 61a is fitted into left recess 20a through a fitting member 67. In this way, pump control arm 60 disposed on the left outside of housing 10 interlocks with movable swash plate 20. Outer opening 11i of right shaft hole 11h, which is not used for supporting a pivot shaft of pump control arm 60, is plugged with a cap 68. A neutral-returning mechanism including spring 66 will be described later in description of the following embodiment of FIG. 7 with reference to FIG. 8.

Description will now be given of an alternative arrangement of pump control arm 60 disposed at the right side of housing 10 (on the laterally proximal side of left transaxle TL). Pump control arm 60 is fixed on an outer end of laterally horizontal pump control shaft 70 rotatably passed through bush 64 in right shaft hole 11h, and a fluid seal 63 is fitted into outer opening 11i around pump control shaft 70.

In HST chamber 10a, pump control shaft 70 is formed integrally with an inner arm 70 projecting outward from shaft hole 11h. Inner arm 61a is fitted into right recess 20a through fitting member 67. In this way, pump control arm 60 disposed on the right outside of housing 10 interlocks with movable swash plate 20.

Housing 10 is configured to have an insufficient space in HST chamber 10a adjacent to right shaft hole 11h for providing spring-wound member 65 and spring 66 around the inner end portion of pump control shaft 70, while the space in HST chamber 10a adjacent to left shaft hole 11f is sufficient for providing spring-wound member 65 and spring 66 as provided on pump control shaft 61. Therefore, in the case where pump control shaft 70 having pump control arm 60 is fitted through right shaft hole 11h, a pivot shaft 69 for neutral-returning is rotatably passed through a bush 64 in the other left shaft hole 11f, and a fluid seal 63 is fitted into outer opening 11g around pivot shaft 69. Spring-wound member 65 is fixed on a portion of pivot shaft 69 projecting from shaft hole 11f into HST chamber 10a, and neutral-returning spring 66 is wound on spring-wound member 65. In HST chamber 10a, pivot shaft 69 is formed integrally with an arm 69a extended outward from spring-wound member 65. Arm 69a is fitted into left recess 20a through another fitting member 67. In this way, movable swash plate 20 interlocks with pivot shaft 69 disposed on the left side of housing 10, and with pump control arm 60 disposed on the right outside of housing 10.

Figure 8:
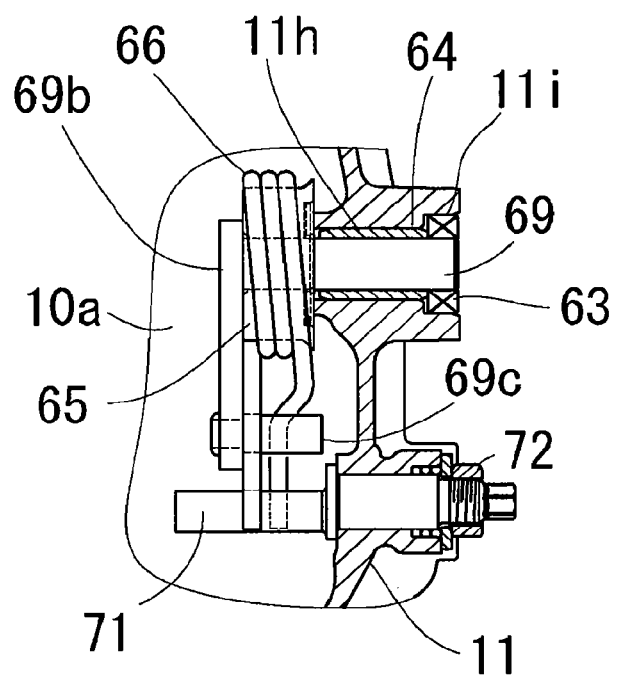
FIG. 8 is a fragmentary sectional plan view of transaxle T showing a portion provided with a neutral returning mechanism for a hydraulic pump when the pump control arm is disposed as shown in FIG. 7.

Referring to FIG. 8, a neutral-returning and neutral-positioning mechanism for movable swash plate 20 and pump control arm 60, including spring 65, will be described. FIG. 8 illustrates the embodiment of FIG. 7 where the neutral-returning and neutral-positioning mechanism is provided on pivot shaft 69. However, this mechanism is also adaptable to the embodiment of FIG. 6. When the mechanism is adapted to the embodiment of FIG. 6, pivot shaft 69 illustrated in FIG. 8 is replaced with pump control shaft 61.

In HST chamber 10a, pivot shaft 69 is formed on the inner end portion thereof with a second arm 69b in addition to arm 69a. A laterally horizontal pin 69c projects from a tip portion of second arm 69b. A neutral-positioning pin 71 is planted into the left side wall of upper housing half 11 so as to project laterally horizontally into HST chamber 10a. A threaded outer end of pin 71 projects outward from housing 10, and a nut 72 is screwed onto the threaded outer end of pin 71 so as to fasten pin 71 to upper housing half 11.

In HST chamber 10a, both end portions of spring 66 wound on spring-wound member 65 fixed on pivot shaft 69 are twisted to cross each other and are linearly extended so as to nip both pins 69c and 71 when pump control arm 60 and movable swash plate 20 are disposed at their neutral position. When pump control arm 60 and movable swash plate 20 are rotated from the neutral position, pivot shaft 69 rotates so that pin 69c pushes one end portion of spring 66 away from the other end portion of spring 66 retained by pin 71, so as to cause a biasing force of spring 66 toward the neutral position. When pump control arm 60 is released from the operation force, the biasing force of spring 66 returns pivot shaft 68, thereby returning movable swash plate 20 and pump control arm 60 to the neutral position.

Pin 71 is an eccentric pin to be used for adjusting the neutral position. When the neutral position of pump control arm 60 deviates from the neutral position of movable swash plate 20 corresponding to a proper neutral position of hydraulic pump 2, nut 72 is loosened and pin 71 is rotated so as to adjust the neutral position of pivot shaft 69 defined by the position of spring 66 nipping both pins 69c and 71 between its end portions. Then, nut 72 is screwed up to fix pin 71 to upper housing half 11 again.

FIG. 9 illustrates another embodiment where left and right pump control arms 60 on opposite sides of housing 10. This embodiment is realized by replacing pivot shaft 69 shown in FIG. 7 with pump control shaft 61 on which pump control arm 60 is fixed. Due to the pair of left and right pump control arms 60, one of pump control arms 60 can be selected to be operatively connected to a speed control device of a vehicle equipped with transaxle T.

The deceleration gear train interposed between motor shaft 31 of hydraulic motor 3 and axle 1 has been described with reference to FIG. 1. Only additional features of the deceleration gear train will now be described with reference to FIGS. 1, 5 to 7 and 9. Gears 32, 34, 35 and 36 and counter shaft 33, constituting the deceleration gear train, are disposed in gear chamber 10b. Laterally horizontal motor shaft 31 is disposed so as to have its center axis on the joint surface between upper and lower housing halves 11 and 12 as mentioned above. Counter shaft 33 is extended laterally horizontally, and is disposed between motor 31 and axle 1 in the fore-and-aft direction. Counter shaft 33 is disposed so as to have a top end thereof on the joint surface between upper and lower housing halves 11 and 12, is supported at a left end thereof by upper and lower walls 11a and 12a constituting partition wall 10c, and is supported at a right end thereof by right side walls of upper and lower housing halves 11 and 12. Final pinion 35 is axially extended over counter shaft 33, and gear 34 is relatively unrotatably fitted on final pinion 35.

As shown in FIGS. 2 and 9, collar 81 serving as a radial bearing is provided on axle 1 leftward adjacent to bull gear 36 in gear chamber 10b, and is engaged into the sectionally semicircular recess in support wall 12e formed of lower housing half 12. The arrangement of collar 81 on axle 1 in left transaxle TL shown in FIGS. 2 and 9 is the same with that of right transaxle TR shown in FIG. 3. Further, as shown in FIG. 9, upper housing half 11 is formed with a wall 11m, and walls 11m and 12e sandwich collar 81. Support wall 81 is extended to be formed with the portion supporting magnet 29 in gear chamber 10b. Axle 1 is fixedly provided on the outer end thereof outside of housing 10 with a flange 1a to be connected to drive wheel 80.

Referring to FIGS. 2 and 9, the peculiar structure of supporting axle 1 to left transaxle TL will be described. As mentioned above, axle 1 (left axle 1L) of left transaxle TL is axially longer than axle 1 (right axle 1R) of right transaxle TR. The restriction mechanism for restricting axial slide of left axle 1L is disposed on the right end of axle 1L.

In the restriction mechanism, upper housing half 11 is formed with a vertical wall surface facing the right end surface of left axle 1L, and a stopper plate 85, made of metal or the like, is disposed along this vertical wall surface of upper housing half 11 so as to be adapted to abut against the right end surface of axle 1L having slid rightward. On the other hand, a retaining ring 84 is engaged on a right end portion of axle 1L, and a spacer 83 is provided on axle 1L leftward from retaining ring 84. Upper housing half 11 is formed with a stopper portion 11d, which is disposed leftward from spacer 83 (toward bull gear 36) and extended vertically toward axle 1L. A plate 82 is disposed between spacer 83 and stopper portion 11d. In this way, stopper portion 11d is adapted to abut against plate 82 through spacer 83 when axle 1 slides leftward.

Referring to FIGS. 2, 5, 11 and 12, the wet inner brake provided on motor shaft 31 will be described. As mentioned above, vertical discoid brake rotor is fixed on motor shaft 31 in gear chamber 10b. A vertical brake camshaft 41 is disposed between brake rotor 40 and partition wall 10c leftward from brake rotor 40 so as to be rotatably supported at a vertical intermediate portion thereof by upper housing half 11. Brake camshaft 41 is formed at a lower portion thereof with a cam portion, which is semicircular in sectional plan view, such as to have a vertical flat surface. The vertical flat surface faces brake rotor 40 in parallel when the brake is released. A brake shoe 45, which is U-shaped in plan view, is disposed between the vertical flat surface of brake camshaft 41 and brake rotor 40 so as to cover the cam portion. A brake pad 46 is disposed between brake rotor 40 and the outer wall of upper housing half 11 disposed rightward from brake rotor 40.

Brake camshaft 41 projects upward from upper housing half 11 so as to be fixedly provided on a top thereof with a brake arm 42. A braking position and an unbraking position are provided for brake arm 42 in its rotational direction above an upper surface of upper housing half 11. When brake arm 42 is disposed at the braking position, the vertical flat surface of brake camshaft 41 is disposed slantwise in plan view relative to brake rotor 40 so as to push brake shoe 45 at one end thereof, so that brake rotor 40 is sandwiched between brake shoe 45 and brake pad 46, thereby braking motor shaft 31. When brake arm 42 is disposed at the unbraking position, the vertical flat surface of brake camshaft 41 becomes parallel to brake shoe 45 and brake rotor 40, so that brake shoe 45 is separated from brake rotor 40 sp as to allow rotation of motor shaft 31. Brake rotor 40, brake camshaft 41, brake shoe 45 and brake pad 46 are submerged in fluid filled in gear chamber 10b so as to constitute the wet inner brake.

Figure 12:
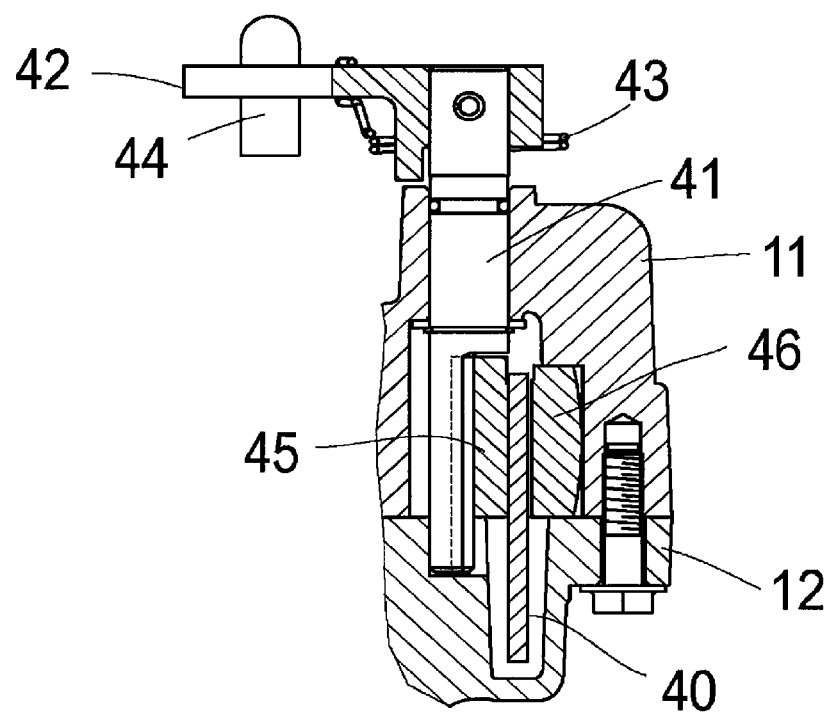
FIG. 12 is a cross sectional view taken along XII-XII line of FIG. 2 showing a brake cam mechanism of the wet inner brake.

Outside of housing 10, a stopper pin 44 shown in FIG. 12 is mounted onto the upper surface of upper housing half 11 or brake arm 42, so as to retain brake arm 42 at either the braking position or the unbraking position. A spring 43 is wound around brake arm 42 so as to bias brake arm 42 to the unbraking position. Hole 10d facing the right end of motor shaft 31 is plugged with cap 47, as mentioned above.

Figure 13:
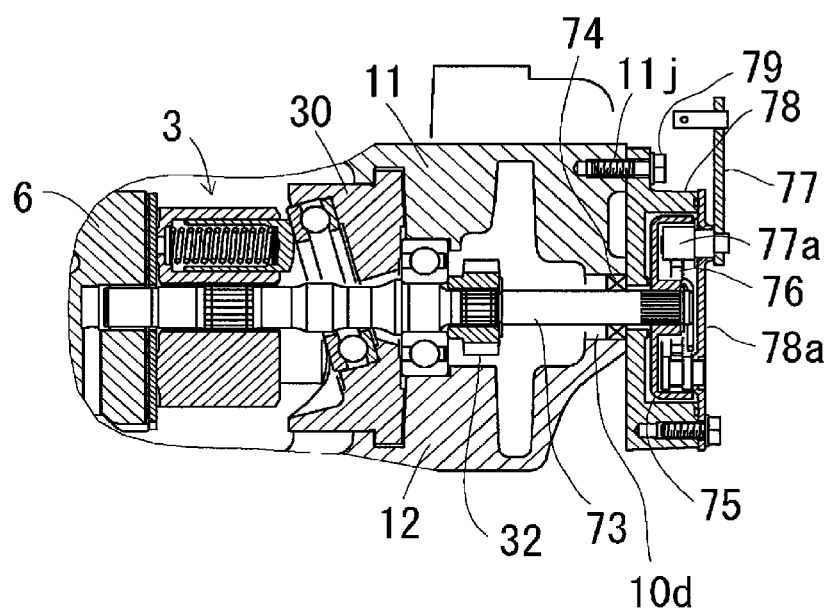
FIG. 13 is a cross sectional view taken along XI-XI line of FIG. 2 when transaxle T (TL) is designed to have a dry outer brake.

Instead of motor shaft 31 and the wet inner brake on motor shaft 31 in housing 10, alternatively, as shown in FIG. 13, transaxle T may be provided with a motor shaft 73 projecting outward from housing 10 and with a dry outer brake on motor shaft 73 as follows:

Hole 10d is opened by removing cap 47. A brake casing 78 is mounted on a right outer side surface of housing 10. In this regard, a tapped hole 11j is formed in upper housing half 11, and a bolt 79 is screwed into tapped hole 11j so as to fasten brake casing 78 to upper housing half 11. Second motor shaft 73, which is axially longer than motor shaft 31, serves as the motor shaft of hydraulic motor 3, and is extended at an outer end thereof into brake casing 78 outside of housing 10 through opened hole 10d. A fluid seal 74 is fitted into hole 10d around motor shaft 73. In brake casing 78, a drum-shaped brake rotor 75 is fixed on a right end of motor shaft 73, and a brake shoe 76 is disposed in a recess of brake rotor 75 around motor shaft 73. Brake casing 78 has a large outer (right) opening through which brake rotor 75 and brake shoe 76 can be inserted or removed into and from brake casing 78. Normally, the opening is covered with a cover plate 78a fixed to a right end of brake casing 78. A vertically rotatable brake arm 77 is disposed outside of cover plate 78a and is connected to brake shoe 77 through a connection shaft 77a penetrating cover plate 78a.

Figure 14:
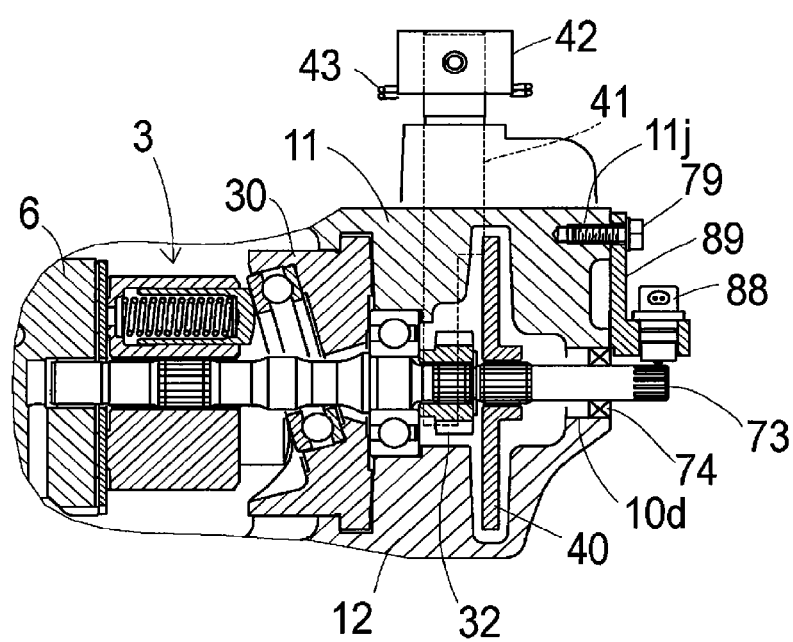
FIG. 14 is a cross sectional view taken along XI-XI line of FIG. 2 when transaxle T (TL) is designed to have the wet inner brake and a rotary speed sensor.

FIG. 14 illustrates an embodiment using long second motor shaft 73, where a rotary speed sensor 88 replacing the dry outer brake is mounted onto the outer side surface of housing 10. The outer end of motor shaft 73 projects outward from housing 10 through hole 10d, and rotary speed sensor 88 is disposed to face the outer end of motor shaft 73. Fluid seal 74 is fitted in hole 10d around motor shaft 73. Rotary speed sensor 88 is mounted on a stay 89 fastened to upper housing half 11 through bolt 79 screwed into tapped hole 11j. In other words, tapped hole 11j and bolt 79 are used for attaching brake casing 78 of the dry outer brake to upper housing half 11, or for attaching stay 89 of rotary speed sensor 88 to upper housing half 11. Incidentally, in this embodiment, the wet inner brake including brake rotor 40 fixed on motor shaft 73 is disposed in gear chamber 10b of housing 10.

Figure 15:
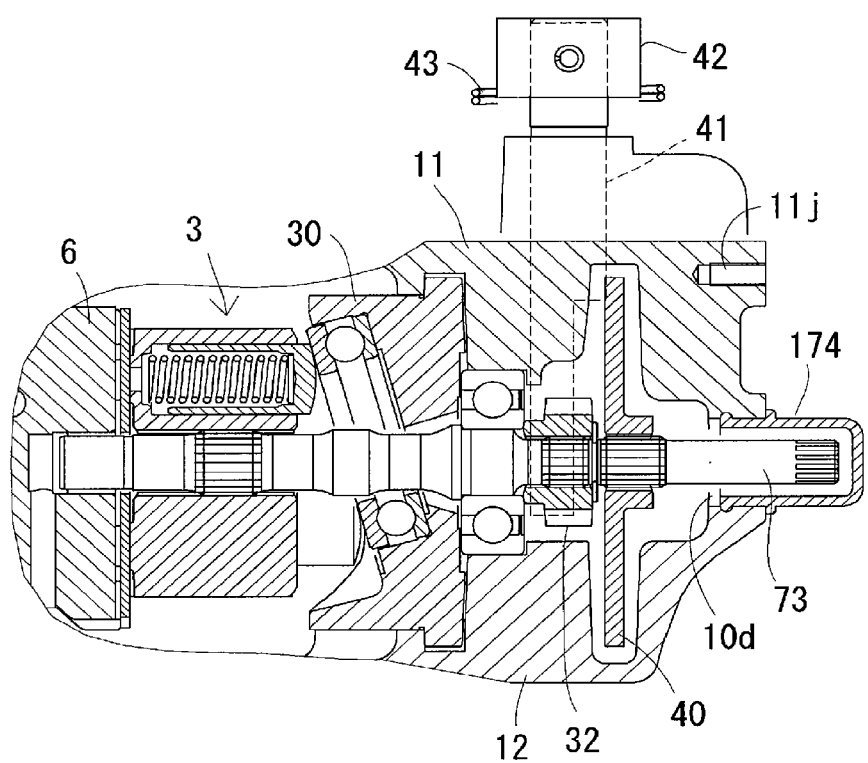
FIG. 15 is a cross sectional view taken along XI-XI line of FIG. 2 when transaxle T (TL) is designed to have the wet inner brake and a long motor shaft adapted for the rotary speed sensor, however, without the rotary speed sensor.

Transaxle T shown in FIG. 15 is provided with long motor shaft 73, and the wet inner brake including brake rotor 40 on motor shaft 73, however, without rotary speed sensor 88. Instead of rotary speed sensor 88, a cylindrical seal cap 174, having one opened end and the other closed end, is fitted at the opened end thereof into hole 10d, and is extended at the closed end thereof outward from housing 10 so as to cover the outer end of motor shaft 73. That is, when transaxle T is provided with long motor shaft 73 projecting outward from housing 10, transaxle T can be easily selectively set into either a first style with rotary speed sensor 88 as shown in FIG. 14 or a second style without rotary speed sensor 88 as shown in FIG. 15. In other words, by removing seal cap 174, transaxle T of the second style shown in FIG. 15 can be easily changed into the first style with rotary speed sensor 88 shown in FIG. 14.

The above-mentioned embodiments are based on the assumption that, as shown in FIGS. 2 and 3, each of left and right transaxles TL and TR is provided with housing 10 having left HST chamber 10a containing the HST and right gear chamber 10b containing the deceleration gear train. Therefore, the brakes or rotary speed sensors 88 are disposed on right sides of respective housings 10 of transaxles TL and TR. Alternatively, right transaxle TR may have the brake or rotary speed sensor 88 on the left side of housing 10 so that housings 10 of left and right transaxles TL and TR may have laterally symmetric arrangements of HST chamber 10a and gear chamber 10b. In other words, both left and right transaxles TL and TR may have the respective brakes and rotary speed sensors 88 on the respective laterally proximal sides of housings 10. Further alternatively, left transaxle TL may have the brake or rotary speed sensor 88 on the left side of housing 10 thereof, and right transaxle TR may have those on the right side of housing 10 thereof, so that both left and right transaxles TL and TR may have the respective brakes and rotary speed sensors 88 on the respective laterally distal sides of housings 10.

Referring to FIGS. 16 to 19, description will be given of an embodiment of a working vehicle equipped with left and right transaxles TL and TR having respective rotary speed sensors 88 and with a steering system S. The illustrated vehicle is a lawn mower (mower tractor) equipped at a fore-and-aft intermediate portion thereof with a mower unit M including a mower deck 103 incorporating rotary blades 104. However, other various type working vehicles are applicable.

Figure 16:
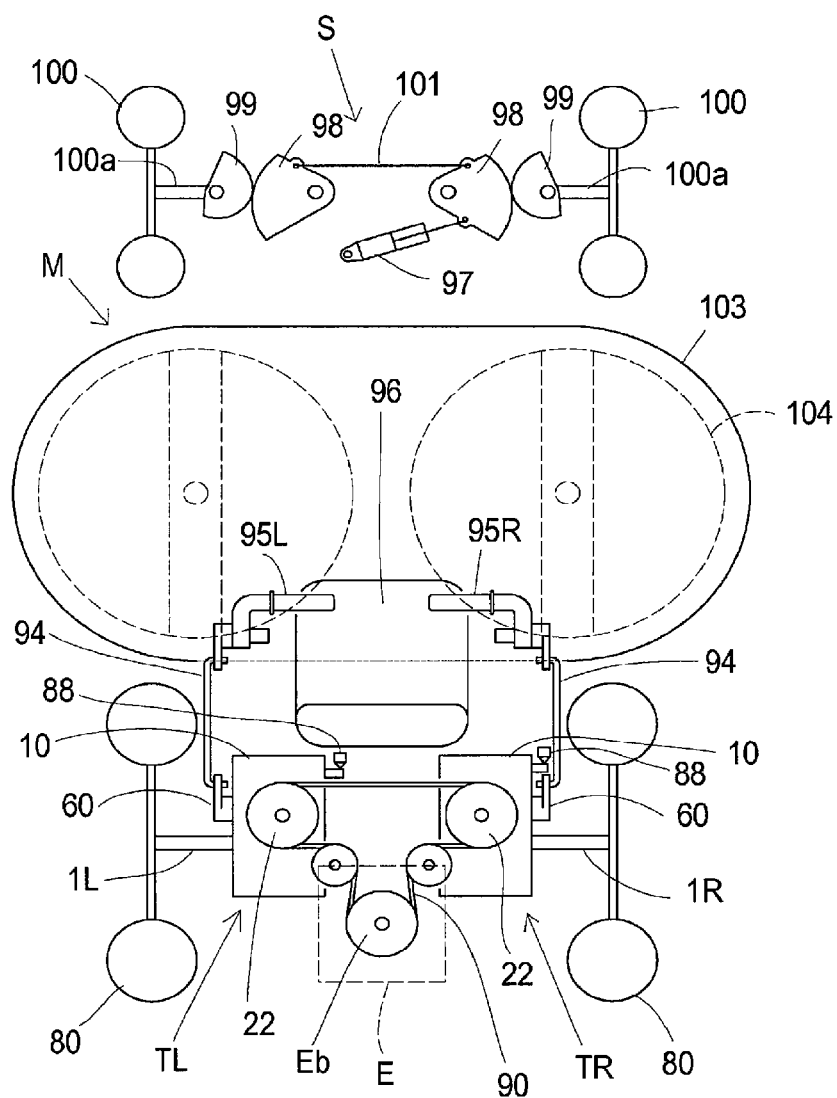
FIG. 16 is a schematic plan view of a working vehicle (lawn mower) equipped with left and right transaxles TL and TR for driving respective rear wheels, wherein transaxles TL and TR have the respective rotary speed sensors for controlling turning angles of steerable front wheels based on detection values of the rotary speed sensors.

Left and right transaxles TL and TR are laterally juxtaposed so as to drive respective drive wheels 80, serving as rear wheels, attached on the outer ends of respective axles 1L and 1R. Incidentally, motor control arms 60 are disposed on the laterally distal sides (on the same sides with the projecting sides of axles 1L and 1R) of housings 10 of respective transaxles TL and TR. A pair of fore-and-aft rotatable left and right speed control levers 95L and 95R are disposed on left and right sides of a driver's seat 96, and are connected to motor control arms 60 of respective transaxles TL and TR through respective link rods 94. FIG. 16 illustrates both speed control levers 95L and 95R disposed at respective neutral positions so that hydraulic pumps 2 of transaxles TL and TR are neutral, thereby stopping the vehicle. When both levers 95L and 95R are rotated at the same angle and direction from the respective neutral positions, both axles 1L and 1R rotate at the same speed and direction, so that the vehicle travels straight.

To turn the vehicle, left and right speed control levers 95L and 95R are differentially rotated, that is, levers 95L and 95R are rotated at different rotation angles (and/or directions) from the respective neutral positions, so as to differentially rotate axles 1L and 1R.

Figure 18:
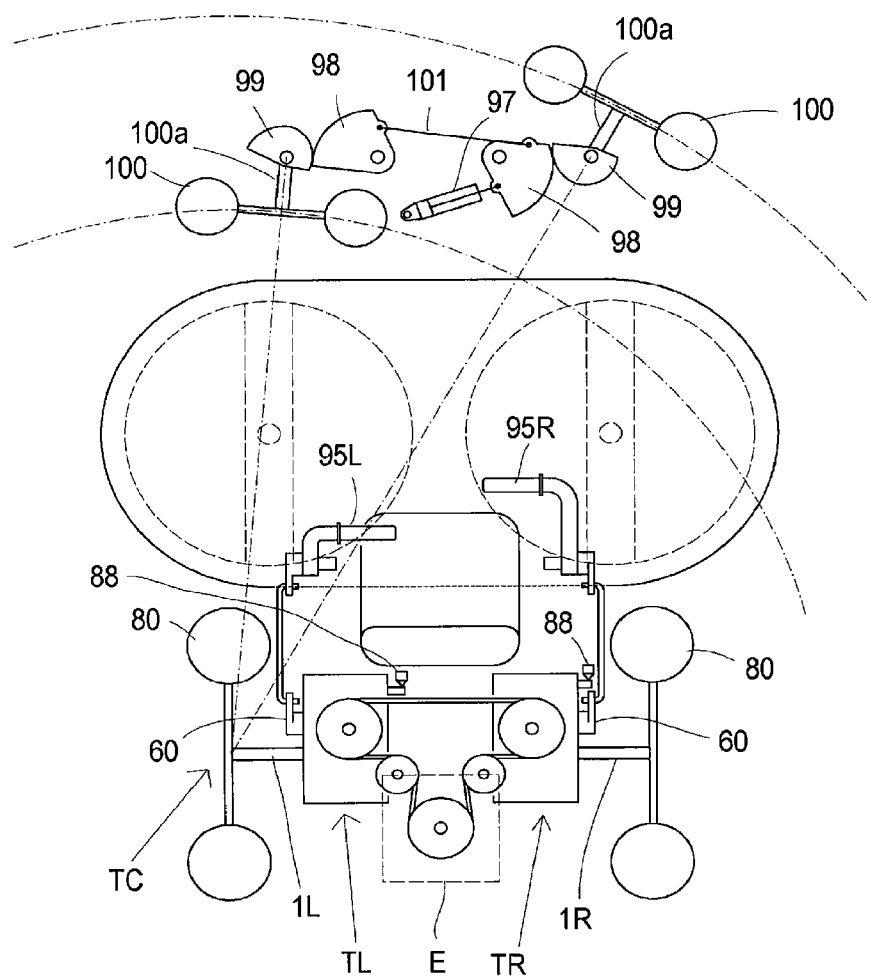
FIG. 18 is a schematic plan view of the working vehicle of FIG. 16 during a brake turn.

FIG. 18 illustrates the vehicle during braking turn, where one lever (in this embodiment, right speed control lever 95R) is rotated forward from its neutral position to an optional forward traveling speed position while the other lever (in this embodiment, left speed control lever 95L) is kept at its neutral position. Therefore, one axle 1 (right axle 1R) rotates forward while the other axle 1 (left axle 1L) is stationary, so that the vehicle turns (leftward) centered on a turning center TC disposed on the stationary axle 1 (left axle 1L).

Figure 19:
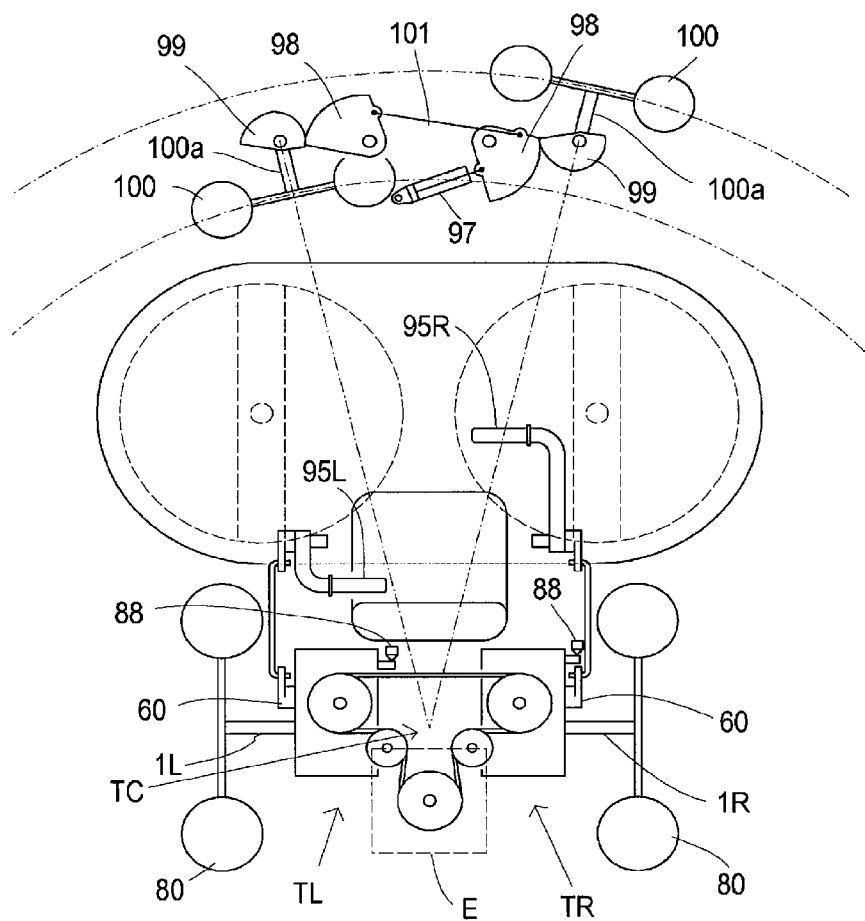
FIG. 19 is a schematic plan view of the working vehicle of FIG. 16 during a zero turn.

FIG. 19 illustrates the vehicle during zero turn, where one lever (in this embodiment, right speed control lever 95R) is rotated forward from its neutral position at an optional angle, and simultaneously, the other lever (in this embodiment, left speed control lever 95L) is rotated rearward from the its neutral position at an angle that is equal to the angle of the forward rotated lever. Therefore, one axle 1 (right axle 1R) rotates forward and the other axle 1 (left axle 1L) rotates rearward at equal speeds, so that the vehicle turns (leftward) centered on turning center TC disposed between axles 1L and 1R (transaxles TL and TR).

Figure 17:
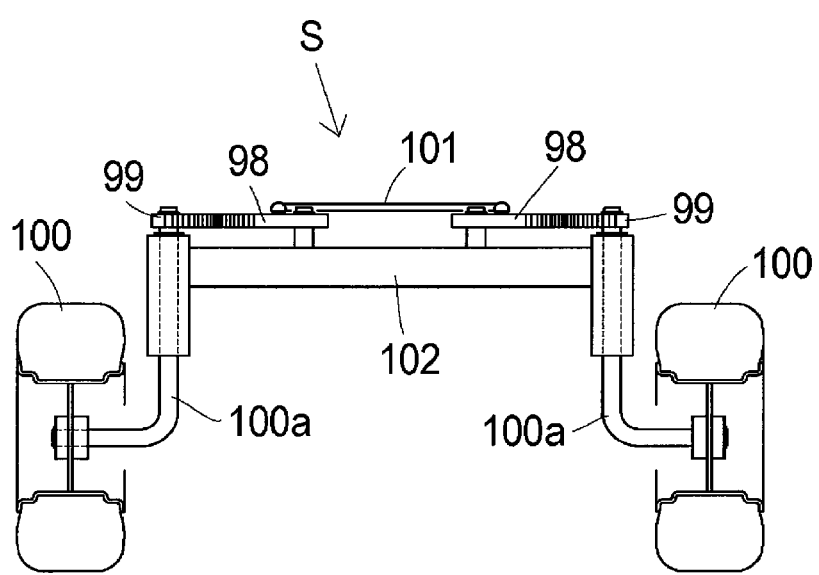
FIG. 17 is a schematic front view of a portion of the working vehicle of FIG. 16 supporting the left and right steerable front wheels.

As shown in FIGS. 16 and 17, the lawn mower is a ZTR (Zero Turn Radius) type lawn tractor, provided with left and right steerable wheels 100 serving as front wheels. Axles 100a of respective steerable wheels 100 are bent upward so as to serve as kingpins pivotally supported on left and right ends of a frame 102. Above frame 102, a pair of left and right non-circular gears 99 are fixed at respective pivotal centers thereof on tops of respective kingpins 100a also serving as the axles of steerable wheels 100, and a pair of left and right non-circular gears 98 are pivoted on the top of frame 102 so as to mesh with respective gears 99. Gears 98 are connected to each other through a tie rod 101. A push/pull type electromagnetic actuator (in this embodiment, a hydraulic power steering cylinder activated by an electromagnetic valve) 97 has a piston rod pivotally connected to one of gears 98. In this way, steering system S for turning left and right steerable wheels 100 is configured.

Electromagnetic actuator 97 is telescopically controlled by a controller (not shown) so as to turn left and right front steerable wheels 100 at appropriate angles and in appropriate directions in correspondence to the differential rotation of left and right rear wheels 80 (axles 1L and 1R). In this way, a steer-by-wire control system is configured so that, to detect the differential rotation (rotary speed and direction) of left and right rear wheels 80, the rotary speed and direction of each motor shaft 73 is detected by rotary speed sensor 88 of each of transaxles TL and TR, and the controller telescopically controls electromagnetic actuator 97 for turning steering system S based on the detection values of both rotary speed sensors 88. Incidentally, in this embodiment, rotary speed sensors 88 are disposed on right sides of transaxles TL and TR.

As shown in FIGS. 18 and 19, during the brake or zero turn of the vehicle, steerable wheels 100 steered by steering system S are oriented substantially laterally of the vehicle, i.e., substantially perpendicular to the fore-and-aft direction of the vehicle traveling along the turning direction, so as to realize a sharp turn of the vehicle. Casters may serve as front wheels that can be turned substantially laterally of the vehicle during the brake or zero turn. However, in comparison with casters, steerable wheels 100 are forcibly set in the turning direction and angle by steering system S so as to stabilize the attitude of the vehicle during turning of the vehicle traveling on not only a flat place but also a slope.

Figure 20:
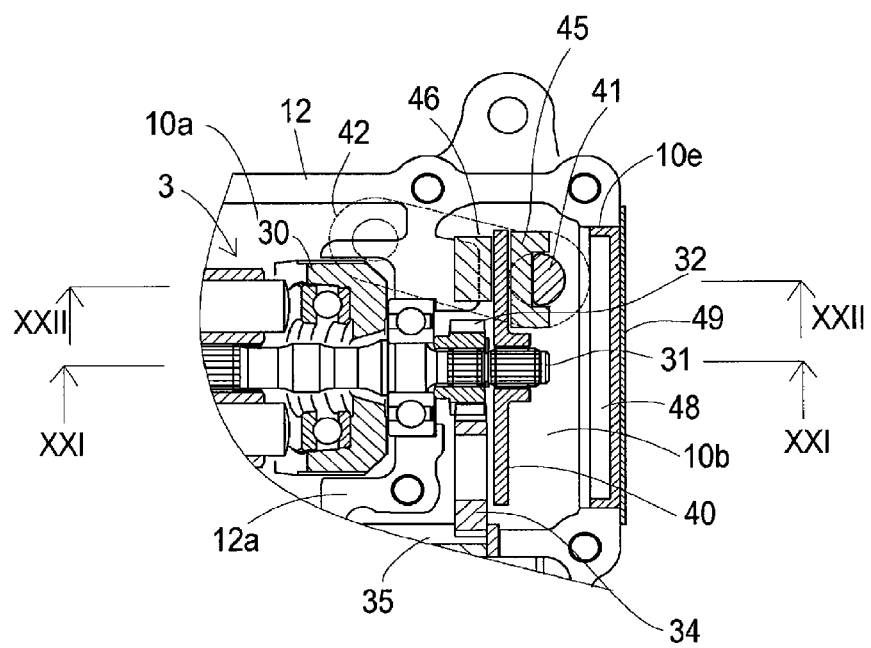
FIG. 20 is a fragmentary sectional plan view of transaxle T whose housing incorporates an alternative second wet inner brake and is formed with an alternative diametrically large hole facing the brake.
Figure 21:
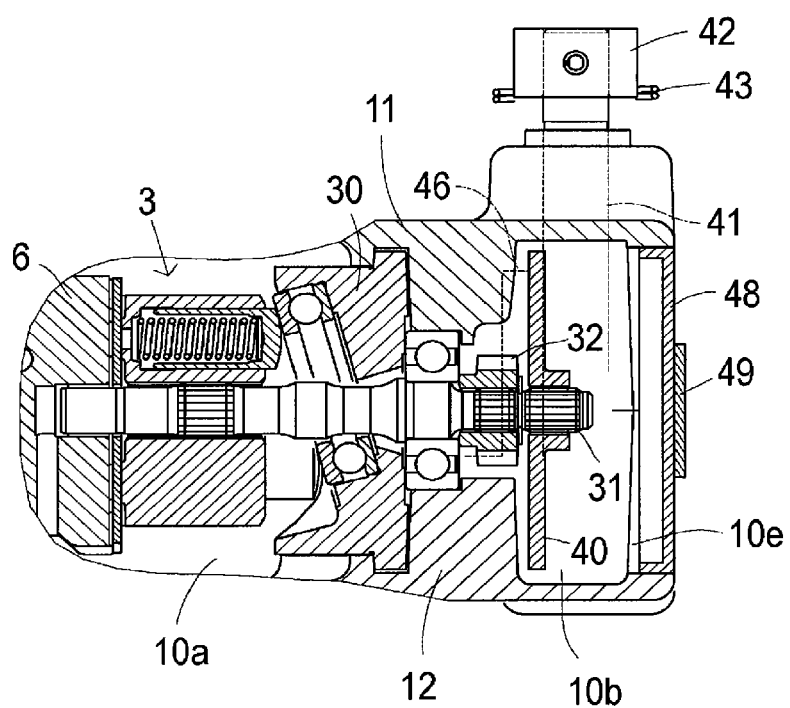
FIG. 21 is a cross sectional view taken along XXI-XXI line of FIG. 20.
Figure 22:
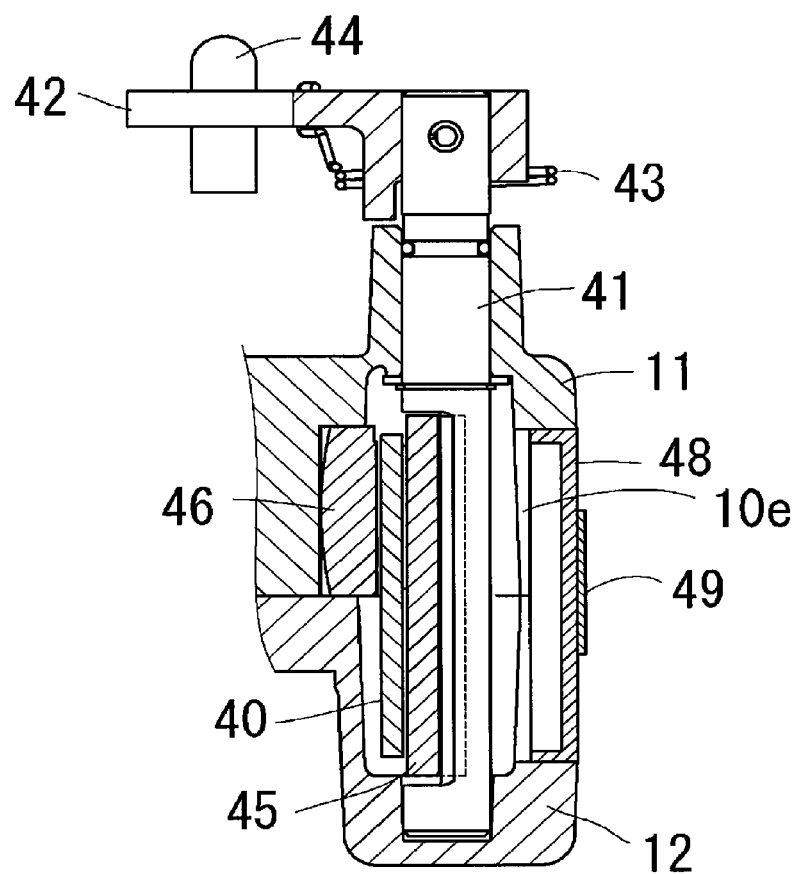
FIG. 22 is a cross sectional view taken along XXII-XXII line of FIG. 20.

FIGS. 20 to 22 illustrate an embodiment where housing 10 incorporating the wet inner brake is formed with a large hole 10e facing brake rotor 40 in gear chamber 10b, instead of hole 10d. Hole 10e has an opening that is diametrically larger than brake rotor 40. Normally, hole 10e is plugged with a cap 48, and cap 48 is retained by a retainer 49 fixed to housing 10. When retainer 49 and cap 48 are removed, the large opening of hole 10e is opened, so that the wet inner brake including brake rotor 40 can be easily assembled or removed into and from housing 10, thereby improving maintenancability. Incidentally, in this embodiment, brake camshaft 41 and brake shoe 45 are disposed rightward from brake rotor 40, i.e., between brake rotor 40 and hole 10e, so as to be easily treatable through opened hole 10e in addition to brake rotor 40.

Figure 23:
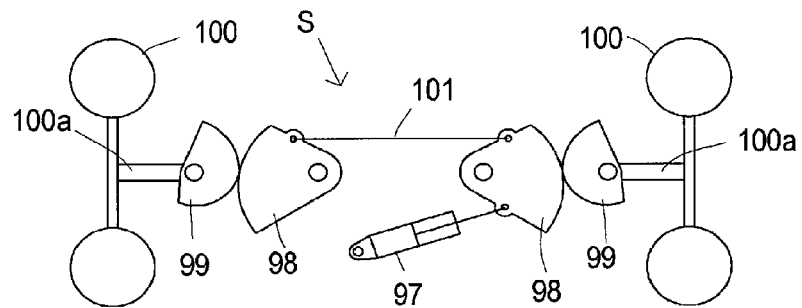
FIG. 23 is a schematic plan view of a working vehicle (lawn mower) equipped with left and right transaxles TL and TR for driving respective rear wheels, wherein transaxles TL and TR have the respective rotary speed sensors for controlling turning angles of steerable front wheels based on detection values of the rotary speed sensors according to a second embodiment.
Figure 23:
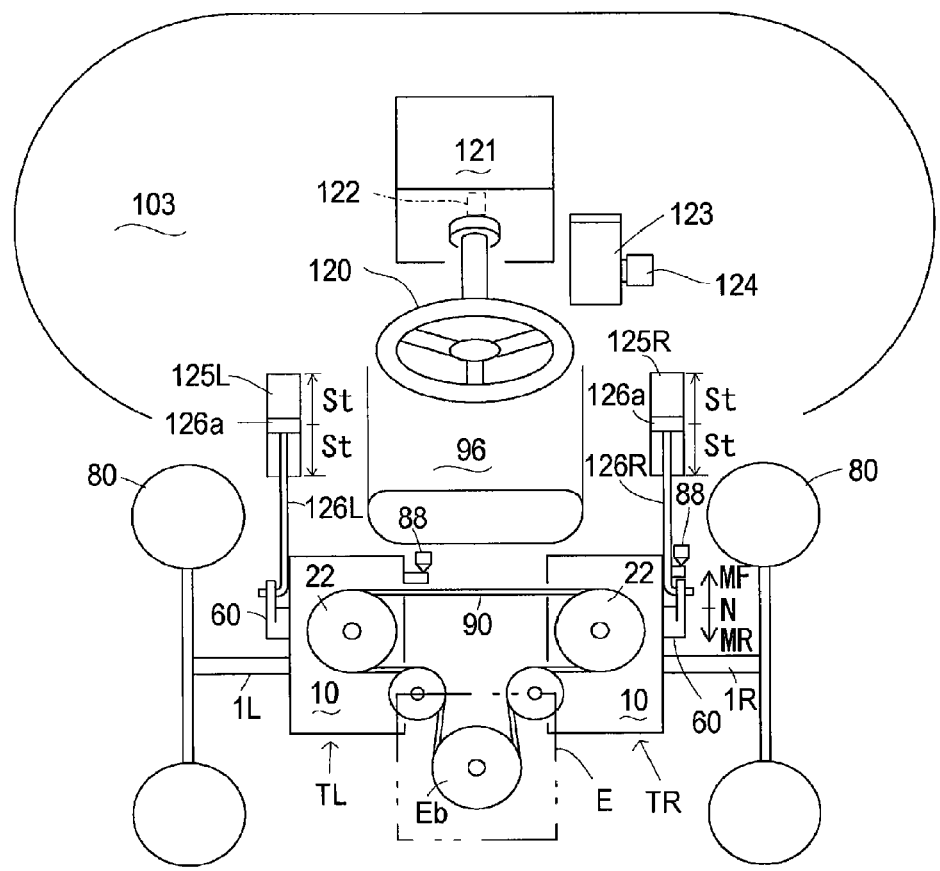
Figure 24:
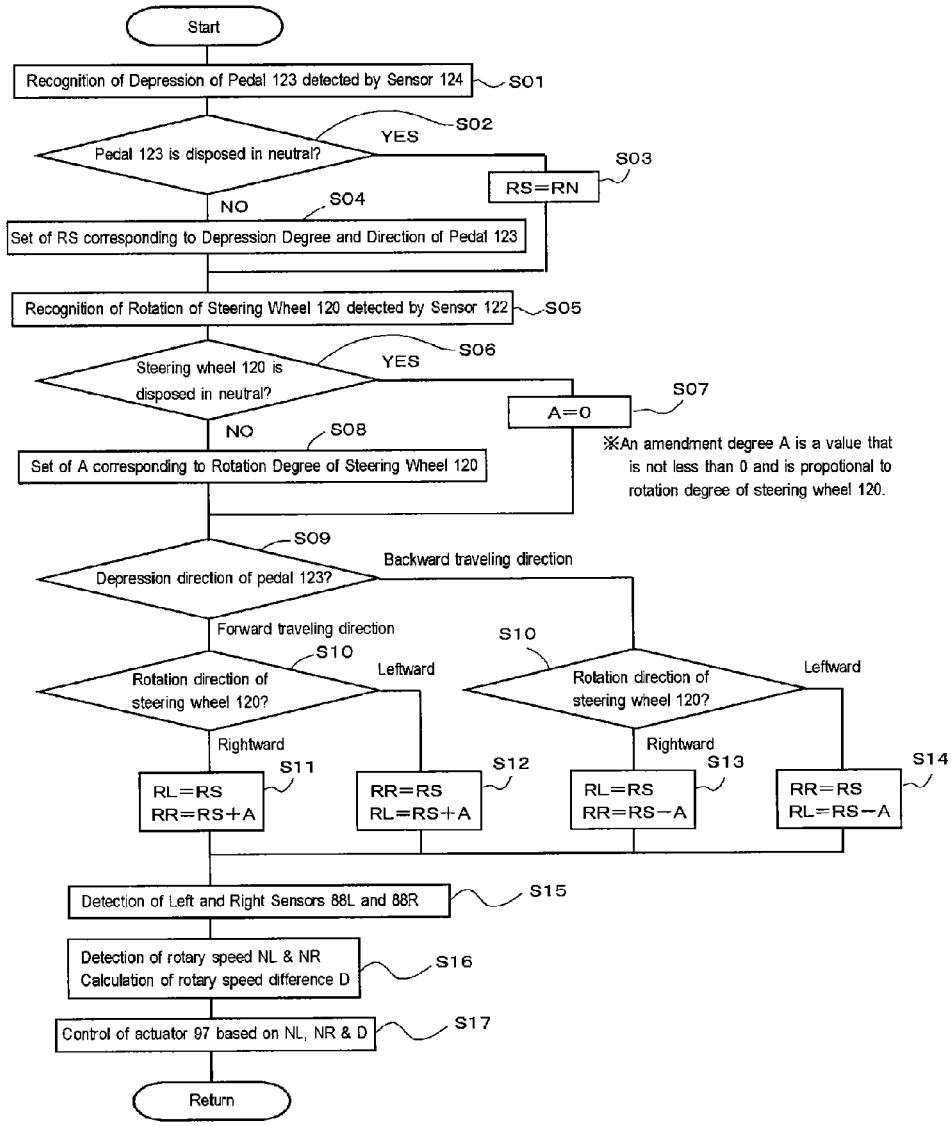
FIG. 24 is a flow chart for turning control of the working vehicle according to the second embodiment.

Referring to FIGS. 23 and 24, a second embodiment of a working vehicle having steering system S and left and right transaxles TL and TR with respective rotary speed sensors 88. The illustrated vehicle is a lawn mower (mower tractor) equipped at a fore-and-aft intermediate portion thereof with mower unit M including mower deck 103 incorporating rotary blades 104. However, other various type working vehicles are applicable. Description of structure and arrangement of members and portions is omitted if they are the same as those in the embodiment of FIGS. 16 to 19.

In the vehicle of the present embodiment, a steering wheel 120 serves as a steering manipulator to be manipulated by an operator sitting on seat 96 with hands, and a speed control pedal 123 serves as a speed controlling manipulator to be depressed by the operator sitting on seat 96 with a foot. A stem of steering wheel 120 is inserted at a base end thereof into a column 121 mounted on a vehicle body frame, and a sensor (angle sensor) 122 is disposed in column 121 so as to detect the left-and-right direction and degree of rotation of the stem (i.e., steering wheel 120) from a neutral position (straight traveling position). Speed control pedal 123 is selectively depressible in one of opposite directions for forward traveling and backward traveling, and a sensor (angle sensor) 124 is disposed adjacent to speed control pedal 123 so as to detect the depression direction and degree of speed control pedal 123. The detection signals from sensors 122 and 124 are inputted to the controller in column 121. In this embodiment, speed control pedal 123 is a single seesaw-shaped pedal. Alternatively, a pair of speed pedals may be provided so that one serves as a forward traveling speed control pedal, and the other serves as a backward traveling speed control pedal. In this case, a pair of sensors 124 are provided to the respective pedals.

In the following description, motor control arm 60 and rotary speed sensor 88 of left transaxle TL are referred to as arm 60L and sensor 88L, motor control arm 60 and rotary speed sensor 88 of right transaxle TR are referred to as arm 60R and sensor 88R, left rear wheel 80 is referred to as wheel 80L, and right rear wheel 80 is referred to as wheel 80R. A pair of left and right slide actuators (e.g., hydraulic cylinders or electromagnetic solenoids) 125L and 125R have respective pistons 126a controlled by output signals from the controller, and have respective rods 125L and 125R extended from respective pistons 126a and connected to respective arms 60L and 60R.

Rod 126L has a variable extension degree RL, and rod 126R has a variable extension degree RR. If slide actuators 125L and 125R are hydraulic cylinders, the variable extension degrees of rods 126L and 126R are defined as the lengths thereof projecting outward from the respective cylinders, which are variable in response to slide of respective pistons 126a. Extension degrees RL and RR are controlled based on the detection values of sensors 122 and 124. Each of extension degrees RL and RR determined based on the depression degree and direction of speed control pedal 123 detected by sensor 124, while sensor 122 detects that steering wheel 120 is disposed at the neutral (straight traveling) position, is referred to as a standard length RS.

Arms 60L and 60R are rotatable in the fore-and-aft direction of the vehicle, and correspondingly, rods 126L and 126R are slidable in the substantially fore-and-aft direction of the vehicle so as to change respective extension degrees RL and RR. The foremost rotation position of each of arms 60L and 60R is referred to as a maximum forward traveling speed position MF, and corresponds to the minimum of each of extension degrees RL and RR. The rearmost rotation position of each of arms 60L and 60R is referred to as a maximum backward traveling speed position MR, and corresponds to the maximum of each of extension degrees RL and RR. The middle rotation position of each of arms 60L and 60R is referred to as a neutral position N, and corresponds to a neutral extension degree RN that is the middle value of each of extension degrees RL and RR between the minimum and maximum.

With respect to each of slide actuators 125L and 125R, piston 126a has even opposite full strokes St from its neutral position (corresponding to neutral position N of arm 60) to its maximum forward traveling speed position (corresponding to maximum forward traveling speed position MF of arm 60) and to its maximum backward traveling speed position (corresponding to maximum backward traveling speed position MR of arm 60). Further, a position difference between pistons 126a, i.e., a difference between extension degrees RL and RR of rods 126L and 126R, is variable within the limit of stroke St. When steering wheel 120 is rotated from the straight traveling position, piston 126a disposed on the outside of the turning vehicle (hereinafter referred to as "turning-outside piston 126a") is kept in position, and piston 126a disposed on the inside of the turning vehicle (hereinafter referred to as "turning-inside piston 126a") moves to a position corresponding to the rotation angle of steering wheel 120, up to the full stroke St. The full rotation of steering wheel 120 for turning of the vehicle from the straight traveling position moves turning-inside piston 126a so as to cause the maximum differential stroke St between moved turning-inside piston 126a and remaining turning-outside piston 126a.

Consequently, when steering wheel 120 is fully rotated for turning of the vehicle while both arms 60L and 60R are disposed at their maximum speed positions MF or MR, turning-inside piston 126a reaches the full stroke St thereof so that corresponding arm 60 reaches its neutral position so as to zero the speed of corresponding rear wheel 80. In other words, in this case, the turn of the vehicle is not zero-turn, but brake-turn that is not so sharp as the zero-turn.

Both arms 60L and 60R are assumed that each arm 60 is disposed at the middle position between the neutral position and maximum forward traveling speed position MF. When steering wheel 120 is fully rotated from the straight traveling position, turning-inside piston 126a moves to shift corresponding arm 60 to the middle position between the neutral position and maximum backward traveling speed position MR, so as to cause the maximum differential stroke St between left and right pistons 126a. In this way, the vehicle turns by forward rotation of one rear wheel 80 and by backward rotation of the other rear wheel 80, i.e., the vehicle spins. However, the maximum differential stroke St between pistons 126a limits the speed of each of left and right rear wheels 80 to the half of maximum, thereby avoiding excessively sharp spin.

Extension degrees RL and RR of respective rods 126L and 126R, i.e., actuation degrees of left and right slide actuators 125L and 125R, are controlled based on detection by sensors 122 and 124. A flow of this control will be described with reference to FIG. 24. Firstly, the controller recognizes the depression of speed control pedal 123 detected by sensor 124 (a step S01), and the controller determines whether speed control pedal 123 is disposed at the neutral position or not (a step S02). If the controller determines that speed control pedal 123 is disposed at the neutral position, the controller sets both standard extensions RS of rods 126L and 126R to respective neutral extensions RN (a step S03). If the controller determines that speed control pedal 123 is not disposed at the neutral position, the controller sets both standard extensions RS of rods 126L and 126R to extensions corresponding to the depression degree and direction of speed control pedal 123 (a step S04).

Then, the controller recognizes the rotation of steering wheel 120 detected by sensor 122 (a step S05), and the controller determines whether steering wheel 120 is disposed at the straight traveling position (a step S06). In this regard, to differentially rotate left and right rear wheels 80L and 80R in correspondence to the rotational angle of steering wheel 120, the controller uses an amendment degree A for controlling slide actuator 125L or 125R disposed on the inside of the turning vehicle so as to decelerate left or right rear wheel 80 on the inside of the turning vehicle. Amendment degree A is a value that is not less than zero and corresponds to the rotation degree of steering wheel 120 from the neutral position. If the controller determines that steering wheel 120 is disposed at the straight traveling (neutral) position, the controller zeroes both amendment degrees A of standard extensions RS of rods 126L and 126R (a step S07). If the controller determines that steering wheel 120 is not disposed at the straight traveling position, the controller sets amendment degree A of standard extension RS of one of rods 126L and 126R to a value corresponding to the rotation degree of steering wheel 120 (a step S08).

Then, according to the detection by sensors 122 and 124, the controller determines in which direction speed control pedal 123 is depressed, i.e., whether speed control pedal 123 is depressed for forward traveling or for backward traveling (a step S09), and in which direction steering wheel 120 is rotated, i.e., whether steering wheel 120 is rotated for leftward turning or for rightward turning (a step S10).

When the controller determines that speed control pedal 123 is depressed for forward traveling and steering wheel 120 is rotated rightward, left rod extension degree RL is set to standard extension degree RS corresponding to the depression degree of speed control pedal 123, and right rod extension degree RR is increased to become standard extension degree RS plus amendment degree A (a step S11). Consequently, right rod 126R is extended so as to reduce the forward rotation degree of right arm 60R from neutral position N, thereby reducing the rotary speed of right rear wheel 80R to a value less than the proper speed during straight traveling (the straight traveling speed), while left rear wheel 80L is kept to rotate at the straight traveling speed. In this way, the forward-traveling vehicle turns rightward by a turning radius determined depending on the depression degree of speed control pedal 123 in the depression direction for forward traveling and on the rightward rotation degree of steering wheel 120.

When the controller determines that speed control pedal 123 is depressed for forward traveling and steering wheel 120 is rotated leftward, right rod extension degree RR is set to standard extension degree RS corresponding to the depression degree of speed control pedal 123, and left rod extension degree RL is increased to become standard extension degree RS plus amendment degree A (a step S12). Consequently, left rod 126L is extended so as to reduce the forward rotation degree of left arm 60L from neutral position N, thereby reducing the rotary speed of left rear wheel 80L to a value less than the straight traveling speed, while right rear wheel 80R is kept to rotate at the straight traveling speed. In this way, the forward-traveling vehicle turns leftward by a turning radius determined depending on the depression degree of speed control pedal 123 in the depression direction for forward traveling and on the leftward rotation degree of steering wheel 120.

When the controller determines that speed control pedal 123 is depressed for backward traveling and steering wheel 120 is rotated rightward, left rod extension degree RL is set to standard extension degree RS corresponding to the depression degree of speed control pedal 123, and right rod extension degree RR is increased to become standard extension degree RS minus amendment degree A (a step S13). Consequently, right rod 126R is contracted so as to reduce the rearward rotation degree of right arm 60R from neutral position N, thereby reducing the rotary speed of right rear wheel 80R to a value less than the straight traveling speed, while left rear wheel 80L is kept to rotate at the straight traveling speed. In this way, the backward-traveling vehicle turns rightward by a turning radius determined depending on the depression degree of speed control pedal 123 in the depression direction for backward traveling and on the rightward rotation degree of steering wheel 120.

When the controller determines that speed control pedal 123 is depressed for backward traveling and steering wheel 120 is rotated leftward, right rod extension degree RR is set to standard extension degree RS corresponding to the depression degree of speed control pedal 123, and left rod extension degree RL is increased to become standard extension degree RS minus amendment degree A (a step S14). Consequently, left rod 126L is contracted so as to reduce the rearward rotation degree of left arm 60L from neutral position N, thereby reducing the rotary speed of left rear wheel 80L to a value less than the straight traveling speed, while right rear wheel 80R is kept to rotate at the straight traveling speed. In this way, the backward-traveling vehicle turns leftward by a turning radius determined depending on the depression degree of speed control pedal 123 in the depression direction for backward traveling and on the leftward rotation degree of steering wheel 120.

In this way, the differential rotation of left and right rear wheels 80L and 80R for turning of the vehicle is controlled. Especially, due to the above control, rear wheels 80L and 80R during backward traveling of the vehicle are prevented from rotating so as to turn the vehicle in the opposite direction to the rotation direction of steering wheel 120.

If speed control pedal 123 is determined to be disposed at the neutral position (step S02) and standard extension degree RS is set to neutral extension degree RN (step S03), the subsequent process from step S05 to any of steps S11 to S14 is realized so that extension degree RL or RR of rod 126L or 126R on the outside of the turning vehicle is set to neutral extension degree RN, so as to set corresponding arm 60 at neutral position N and to stop corresponding rear wheel 80, and simultaneously, extension degree RL or RR of rod 126L or 126R on the inside of the turning vehicle is increased or reduced to become neutral extension degree RN plus or minus amendment degree A, thereby rotating corresponding arm 60 from neutral position N and to rotate corresponding rear wheel 80 forward or backward. In other words, when steering wheel 120 is rotated while speed control pedal 123 is disposed at the neutral position, the vehicle brake-turns.

If steering wheel 120 is determined to be disposed at the straight traveling (neutral) position (step S06) and amendment degree A is set to zero (step S07), the subsequent process from step S09 to any of steps S11 to 14 is realized so that left and right rod extension degrees RL and RR become even standard extension degrees RS. Thus, arms 60L and 60R are disposed at even rotational positions corresponding to the depression of speed control pedal 123, whereby the vehicle travels straight.

Further, when speed control pedal 123 and steering wheel 120 are disposed at the respective neutral positions, standard extension degree RS is set to neutral extension degree RN (step S03), amendment degree A is zeroed (step S07), and the subsequent process from step S09 to any of steps S11 to 14 is realized so that left and right extension degrees RL and RR become even neutral extension degrees RN so as to set arms 60L and 60R at respective neutral positions N, whereby the vehicle stops.

On the assumption that the vehicle has steering system S for controlling the steering angles of steerable front wheels 100 as shown in FIG. 23, based on detection by left and right sensors 88L and 88R (a step S15), the controller determines a motor shaft rotary speed NL (and direction) of left transaxle TL and a motor shaft rotary speed NR (and direction) of right transaxle TR, and calculates a difference D between motor shaft rotary speeds NL and NR (a step S16). The controller determines a rod extension degree of electromagnetic actuator 97 based on these detection values NL and NR and calculated value D, and controls electromagnetic actuator 97 (a step S17), thereby leftward or rightward turning left and right front wheels 100 through steering system S in correspondence to the rotary speed and rotary speed difference of rear wheels 80L and 80R. Alternatively, if the vehicle has one or more casters as a front wheel or front wheels, the control flow from step S15 to step S17 is omitted.

The above-mentioned transaxle T has the single left or right axle 1 disposed in housing 10, so as to serve as one of the pair of left and right transaxles TL and TR. Alternatively, transaxle T may have another axle 1 disposed in housing 10 so as to be driven by selected motor shaft 31 or 73. Further alternatively, a differential gear unit may be disposed in housing 10, and provided with bull gear 36 serving as an input gear thereof, so as to differentially connecting the pair of left and right axles 1 to each other.

It is further understood by those skilled in the art that the foregoing description is a preferred embodiment of the disclosed device and that various changes and modifications may be made in the invention without departing from the spirit and scope thereof.

What is claimed is:

1. A vehicle comprising:
a pair of right and left first wheels;
a pair of right and left transaxle housings fixed to a vehicle body of the vehicle so as to rotatably support the respective right and left first wheels;
wherein the right and left transaxle housings incorporate respective transmissions whose output rotations drive the respective right and left first wheels;
a speed controlling manipulator supported on the vehicle body, wherein the speed controlling manipulator is operable to a neutral position, is operable in a forward-traveling speed range between the neutral position and a maximum forward-traveling speed position, and is operable in a backward-traveling speed range between the neutral position and a maximum backward-traveling speed position;

a steering manipulator supported on the vehicle body, wherein the steering manipulator is operable to a straight-traveling position, is operable in a right turning range between the straight-traveling position and a right turning limit position, and is operable in a left turning range between the straight-traveling position and a left turning limit position;

a pair of first actuators operatively connected to the respective transmissions in the respective right and left transaxle housings so as to be operated in correspondence to operational direction and degree of the speed controlling manipulator and operational direction and degree of the steering manipulator;

a pair of right and left second wheels supported by the vehicle body so as to be steerable in right and left directions relative to the vehicle body;

a second actuator for steering the right and left second wheels in right and left directions relative to the vehicle body;

a pair of right and left sensors for detecting rotary speeds and directions of the transmissions in the respective right and left transaxles; and a controller, which controls the first actuators in correspondence to the operation direction and degree of the speed controlling manipulator and the operation direction and degree of the steering manipulator, and which controls the second actuator in correspondence to the operation directions and degrees of the respective first actuators detected by the respective sensors, wherein each of the first actuators is actuative between a first limit position and a second limit position, wherein a neutral position of each of the first actuators is defined at a middle position between the first and second limit positions so that, when the speed controlling manipulator is set at its neutral position and the steering manipulator is set at the straight-traveling position, both of the actuators are disposed at their respective neutral positions, wherein any position of the speed controlling manipulator defines a corresponding standard position of each of the first actuators, wherein any position of the steering manipulator defines a differential actuation degree between the first actuators so that one of the first actuators is actuated in one direction toward the first limit position from the standard position to a half of the differential actuation degree, and the other of the first actuators is actuated in the other direction toward the second limit position from the standard position to a half of the differential actuation degree, and the differential actuation degree is changed according to change of the operational degree of the steering manipulator from the straight-traveling position regardless of whether the position of the steering manipulator at the operational degree from the straight-traveling position exists in the right turning range or in the left turning range, wherein the first actuator operatively connected to the transmission in the right transaxle housing is actuated toward the first limit position and the first actuator operatively connected to the transmission in the left transaxle housing is actuated toward the second limit position when the speed controlling manipulator is operated in the forward-traveling speed range and the steering manipulator is operated in the right turning range and when the speed controlling manipulator is operated in the backward-traveling speed range and the steering manipulator is operated in the left turning range, and wherein the first actuator operatively connected to the transmission in the left transaxle housing is actuated toward the first limit position and the first actuator operatively connected to the transmission in the right transaxle housing is actuated toward the second limit position when the speed controlling manipulator is operated in the forward-traveling speed range and the steering manipulator is operated in the left turning range and when the speed controlling manipulator is operated in the backward-traveling speed range and the steering manipulator is operated in the right turning range.

2. The vehicle according to claim 1, wherein a maximum value of the differential actuation degree between the actuators is equal to an actuation degree of each of the actuators between the neutral position and the first or second limit position, and wherein the differential actuation degree reaches the maximum value only when the steering manipulator reaches the right or left turning limit position.

3. The vehicle according to claim 1, wherein the transmission in each of the right and left transaxle housings includes a hydraulic motor for driving the corresponding first wheel.

4. The vehicle according to claim 3, wherein the transmission in each of the right and left transaxle housings includes a hydraulic pump for driving the hydraulic motor.

5. The vehicle according to claim 1, further comprising:
a pair of right and left non-circular gear mechanisms operatively connected to the respective right and left second wheels and to the second actuator, wherein the right and left non-circular gear mechanisms are moved by operating the second actuator so as to steer the right and left second wheels in right and left directions relative to the vehicle body.

* * * * *